US010966141B2

(12) United States Patent
Cudak et al.

(10) Patent No.: US 10,966,141 B2
(45) Date of Patent: Mar. 30, 2021

(54) MILLIMETER WAVE ACCESS ARCHITECTURE WITH CLUSTER OF ACCESS POINTS

(71) Applicant: Nokia Solutions and Networks Oy, Espoo (FI)

(72) Inventors: Mark Cudak, Rolling Meadows, IL (US); Amitabha Ghosh, Buffalo Grove, IL (US); Thomas Kovarik, Grayslake, IL (US); Rapeepat Ratasuk, Hoffman Estates, IL (US); Alan Rottinghaus, Barrington, IL (US); Timothy Thomas, Palatine, IL (US); Frederick Vook, Schaumburg, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/413,776

(22) PCT Filed: Jul. 4, 2013

(86) PCT No.: PCT/EP2013/064150
§ 371 (c)(1),
(2) Date: Jan. 9, 2015

(87) PCT Pub. No.: WO2014/009250
PCT Pub. Date: Jan. 16, 2014

(65) Prior Publication Data
US 2015/0201368 A1    Jul. 16, 2015

Related U.S. Application Data

(60) Provisional application No. 61/669,373, filed on Jul. 9, 2012.

(51) Int. Cl.
*H04W 72/04* (2009.01)
*H04W 48/12* (2009.01)
*H04W 48/08* (2009.01)

(52) U.S. Cl.
CPC .......... *H04W 48/08* (2013.01); *H04W 48/12* (2013.01); *H04W 72/046* (2013.01); *H04W 72/0413* (2013.01)

(58) Field of Classification Search
CPC . H04W 48/08; H04W 48/12; H04W 72/0413; H04W 72/046
See application file for complete search history.

(56) References Cited

U.S. PATENT DOCUMENTS

2003/0128690 A1*   7/2003   Elliott ................... H04W 8/005
                                                    370/351
2009/0290493 A1*  11/2009   Xu ........................ H04W 28/08
                                                    370/237

(Continued)

FOREIGN PATENT DOCUMENTS

CN       102196470 A      9/2011
WO    WO 2011/097416 A1   8/2011

OTHER PUBLICATIONS

IEEE Std 802.11ad—2012; "Part 11; Wireless LAN Medium Access Control (MAC) and Physical Layer (PHY) Specifications; Amendment 3: Enhancements for Very High Throughput in the 60 GHz Band"; 2012; IEEE Computer Society, Sections 9, 10 and 21.

(Continued)

*Primary Examiner* — Andrew Lai
*Assistant Examiner* — M Mostazir Rahman
(74) *Attorney, Agent, or Firm* — Harrington & Smith

(57) ABSTRACT

The exemplary embodiments of the invention provide at least a method and an apparatus to determine a beacon signal for a network node, where the network node is configured to connect with a cluster of access points in a wireless com- (Continued)

munication network, and where the beacon signal identifies the cluster; and send the beacon signal towards the wireless communication network. Further, the exemplary embodiments of the invention provide at least a method and an apparatus to determine a dominant access point of a cluster of access points based on signaling from at least one access point associated with the cluster of access points; and in response to the determining, direct communications towards the dominant access point of the cluster of access points.

17 Claims, 15 Drawing Sheets

(56) References Cited

U.S. PATENT DOCUMENTS

| | | | | |
|---|---|---|---|---|
| 2010/0033390 A1* | 2/2010 | Alamouti | ............ | H01Q 1/007 343/755 |
| 2010/0142435 A1* | 6/2010 | Kim | ............ | H04B 7/2606 370/315 |
| 2010/0157955 A1* | 6/2010 | Liu | ............ | H04W 72/0446 370/336 |
| 2010/0265922 A1* | 10/2010 | Bracha | ............ | H04W 74/0808 370/336 |
| 2011/0103248 A1* | 5/2011 | Le Houerou | ....... | H04W 72/082 370/252 |
| 2011/0110340 A1* | 5/2011 | Lakkis | ............ | H04W 74/08 370/336 |
| 2011/0199966 A1* | 8/2011 | Cordeiro | ............ | H04W 16/14 370/328 |
| 2012/0135724 A1* | 5/2012 | Lewis | ............ | H04W 92/20 455/422.1 |

OTHER PUBLICATIONS

IEEE Std 802.15.3c—2009; "Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension"; 2009; IEEE Computer Society; Sections 8.6 and 13.

Y. Takatsuka, et al.; "A Directional MAC Protocol for Practical Smart Antennas"; Proceeding of IEEE Globecom 2006; whole document (6 pages).

T. Korakis, et al.; "CDR-MAC: A Protocol for Full Exploitation of Directional Antennas in Ad Hoc Wireless Networks"; IEEE Transactions on Mobile Computing, vol. 7, No. 2; Feb. 2008; pp. 145-155.

Z. Pi, et al.; "An Introduction to Millimeter-Wave Mobile Broadband Systems"; IEEE Communication Magazine; Jun. 2011; pp. 101-107.

M. Horneffer, et al.; "Directed Antennas in the Mobile Broadband System"; Proceeding of IEEE INFOCOMM; 1996; pp. 704-712.

C. Cordeiro, et al.; "IEEE 802.11ad: Introduction and Performance Evaluation of the First Mulit-Gbps WiFi Technology"; International Workshop on mmWave Communictions; Sep. 24, 2010; Chicago, IL, USA; pp. 3-7.

T. Baykas, et al.; "IEEE 802.15.3c: The First IEEE Wireless Standard for Data Rates over 1Gb/s"; IEEE Communications Magazine; Jul. 2011; pp. 114-121.

* cited by examiner

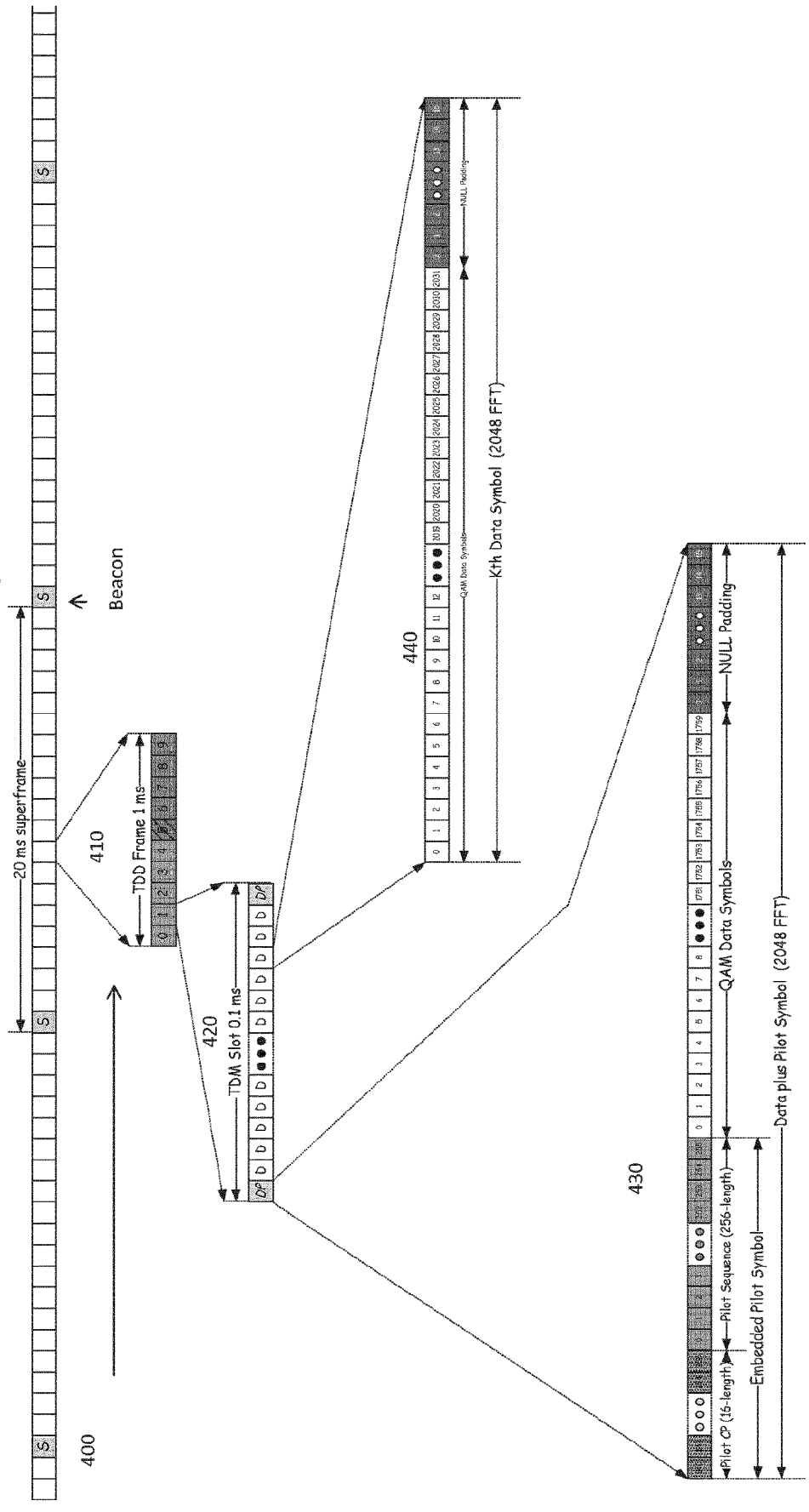
FIGURE 4 Millimeterwave Access – Example Frame Structure

| | LTE | 802.11ad | | | B4G-MMW | | |
|---|---|---|---|---|---|---|---|
| | | | | | | ZP-SC | CP-SC | |
| | | | | | | Data | Pilot | |
| Frequency Band | < 6 GHz | 60 GHz | | | 70 GHz | | |
| Supported Bandwidths | TBD | 2160 MHz | | | 2000 MHz | | |
| Maximum QAM | 64 | 16 | | 64 | 16 | | 2 |
| Modulation | OFDM | Control Spread-SC | SC | OFDM | ZP-SC Data | CP-SC Pilot | OFDM |
| Channel Spacing (B) | 20.0E+6 | 2.16E+9 | 2.16E+9 | 2.16E+9 | 2.0E+9 | 2.0E+9 | |
| FFT Size*** | 2048 | 512 | 512 | 512 | 2048 | | 256 |
| Subcarrier Spacing**** | 15.0E+3 | NA | NA | 5.06E+6 | NA | | |
| Sampling Frequency | 30.7E+6 | 1.76E+9 | 1.76E+9 | 2.46E+9 | 1.54E+9 | | |
| $T_{sampling}$ | 32.6E-9 | 568.2E-12 | 568.2E-12 | 406.5E-12 | 651.0E-12 | | |
| $T_{symbol}$ | 66.7E-6 | 254.5E-9 | 254.5E-9 | 197.5E-9 | 1.333E-6 | | 166.67E-9 |
| $T_{guard}$** | 4.7E-6 | 36.4E-9 | 36.4E-9 | 52.0E-9 | 10.4E-9 | | |
| T | 71.4E-6 | 290.9E-9 | 290.9E-9 | 249.6E-9 | 1.333E-6 | | 177.08E-9 |
| Occupied Subcarriers | 1200 | | | 355 | NA | | |
| Occupied Bandwidth | 18.0E+6 | | | 1.8E+9 | | | |

**LTE guard period is nominally 144 samples, but the guard period of the first symbol in a 7-symbol RB is longer by 16 samples.

***For Single Carrier (SC) the FFT size denotes the number of symbols bundled together including guard symbols

****Subcarrier spacing for 802.11AD

FIGURE 8A

| Frame | 1.0E-3 | 1.0E-3 | 1.0E-3 |
|---|---|---|---|
| Subframe | 100.0E-6 | 100.0E-6 | 100.0E-6 |
| Target CP-length | 10.0E-9 | 1.0E-9 | 50.0E-9 |
| CP-length in Chips | 16 | 2 | 77 |
| Embedded Pilot Symbols per frame | 2 | 2 | 2 |
| Data Symbols per subframe | 73 | 73 | 73 |
| QAM Symbols per Data Symbol | 2032 | 2046 | 1971 |
| QAM Symbols per Embedded Pilot Symbol | 1760 | 1788 | 1638 |
| QAM Symbols per subframe | 152E+3 | 153E+3 | 147E+3 |
| Subframes per Downlink | 5 | 5 | 5 |
| QPSK R=1/2 | 759E+6 | 765E+6 | 736E+6 |
| QPSK R=3/4 | 1.14E+9 | 1.15E+9 | 1.1E+9 |
| 2-Stream QPSK R=3/4 | 2.28E+9 | 2.29E+9 | 2.21E+9 |
| 4-Stream QPSK R=3/4 | 4.56E+9 | 4.59E+9 | 4.41E+9 |

FIGURE 8B

Master Information Block (ASN.1 description)

*MasterInformationBlock*

```
-- ASN1START

MasterInformationBlock ::=      SEQUENCE {
    dl-Bandwidth                    ENUMERATED {
                                        n6, n15, n25, n50, n75, n100},
    phich-Config                    PHICH-Config,
    systemFrameNumber               BIT STRING (SIZE (8)),
    spare                           BIT STRING (SIZE (10))
}

-- ASN1STOP
```

| MasterInformationBlock field descriptions |
|---|
| *dl-Bandwidth* |
| Parameter: transmission bandwidth configuration, $N_{RB}$ in downlink, see TS 36.101 [42, table 5.6-1]. n6 corresponds to 6 resource blocks, n15 to 15 resource blocks and so on. |
| *systemFrameNumber* |
| Defines the 8 most significant bits of the SFN, see TS 36.211 [21, 6.6.1]. The 2 least significant bits of the SFN are acquired implicitly in the P-BCH decoding, i.e. timing of 40ms P-BCH TTI indicates 2 least significant bits (within 40ms P-BCH TTI, the first radio frame: 00, the second radio frame: 01, the third radio frame: 10, the last radio frame: 11). |

FIGURE 9

| | |
|---|---|
| SystemInformationBlockType1 | SystemInformationBlockType1 contains information relevant when evaluating if a UE is allowed to access a cell and defines the scheduling of other system information. |
| SystemInformationBlockType2 | The IE SystemInformationBlockType2 contains radio resource configuration information that is common for all UEs.<br>NOTE: UE timers and constants related to functionality for which parameters are provided in another SIB are included in the correspondin |
| SystemInformationBlockType3 | The IE SystemInformationBlockType3 contains cell re-selection information common for intra-frequency, inter-frequency and/ or inter-RAT cell re-selection (i.e. applicable for more than one type of cell re-selection but not necessarily all) as well as in |
| SystemInformationBlockType4 | The IE SystemInformationBlockType4 contains neighbouring cell related information relevant only for intra-frequency cell re-selection. The IE includes cells with specific re-selection parameters as well as blacklisted cells. |
| SystemInformationBlockType5 | The IE SystemInformationBlockType5 contains information relevant only for inter-frequency cell re-selection i.e. information about other E-UTRA frequencies and inter-frequency neighbouring cells relevant for cell re-selection. The IE includes cell re-se |
| SystemInformationBlockType6 | The IE SystemInformationBlockType6 contains information relevant only for inter-RAT cell re-selection i.e. information about UTRA frequencies and UTRA neighbouring cells relevant for cell re-selection. The IE includes cell re-selection parameters common |
| SystemInformationBlockType7 | The IE SystemInformationBlockType7 contains information relevant only for inter-RAT cell re-selection i.e. information about GERAN frequencies relevant for cell re-selection. The IE includes cell re-selection parameters for each frequency. |
| SystemInformationBlockType8 | The IE SystemInformationBlockType8 contains information relevant only for inter-RAT cell re-selection i.e. information about CDMA2000 frequencies and CDMA2000 neighbouring cells relevant for cell re-selection. The IE includes cell re-selection parameter |

FIGURE 10

MILLIMETER WAVE ACCESS ARCHITECTURE WITH CLUSTER OF ACCESS POINTS

TECHNICAL FIELD

The exemplary and non-limiting embodiments of this invention relate generally to access architectures for deployment of cellular radio equipment employing millimeter wave radio spectrum. The exemplary embodiments of the invention, more specifically, relate to deployment of a set or cluster of co-operating access points deployed to cover a millimeter wave sized cell (e.g. 100 meter radius) and overcome the shadowing and body loss typical of millimeter wave bands.

BACKGROUND

Wireless data traffic is projected to grow by 26× between year 2010 and 2015 exceeding 6×10^18 bytes per month by 2015. Recent innovations in cellular air-interface design, culminating in 3GPP LTE, provide spectral efficiency performance that will be difficult to improve on. To meet the growing traffic demand, the cellular capacity per square meter must be increased by either shrinking cell-sizes or acquiring additional spectrum. To that end, the industry is already pursuing smaller cells through the heterogeneous networks of picos and macros. Similarly, 500 MHz more of spectrum is being made available below 6 GHz to help meet the growing demand. While these efforts will help meet demand in the short term, the projected growth rate of data traffic will exceed this added capacity in the longer term. Moreover, the available spectrum below 6 GHz is limited and there are practical limits to how small cells can shrink. Therefore, the cellular industry must look for new resources in frequencies above to 6 GHz to meet this demand.

BRIEF DESCRIPTION OF THE DRAWINGS

In the attached Drawing Figures:

FIG. 4 illustrates an example frame structure in accordance with the exemplary embodiments of the invention;

FIGS. 8A and 8B illustrate an example modulation numerology null cyclic prefix (CP)—single carrier;

FIG. 9 illustrates an ASN.1 description of a Master Information Block;

FIG. 10 illustrates SystemInformationBlock Types 1-8; and

SUMMARY

Figure 1:
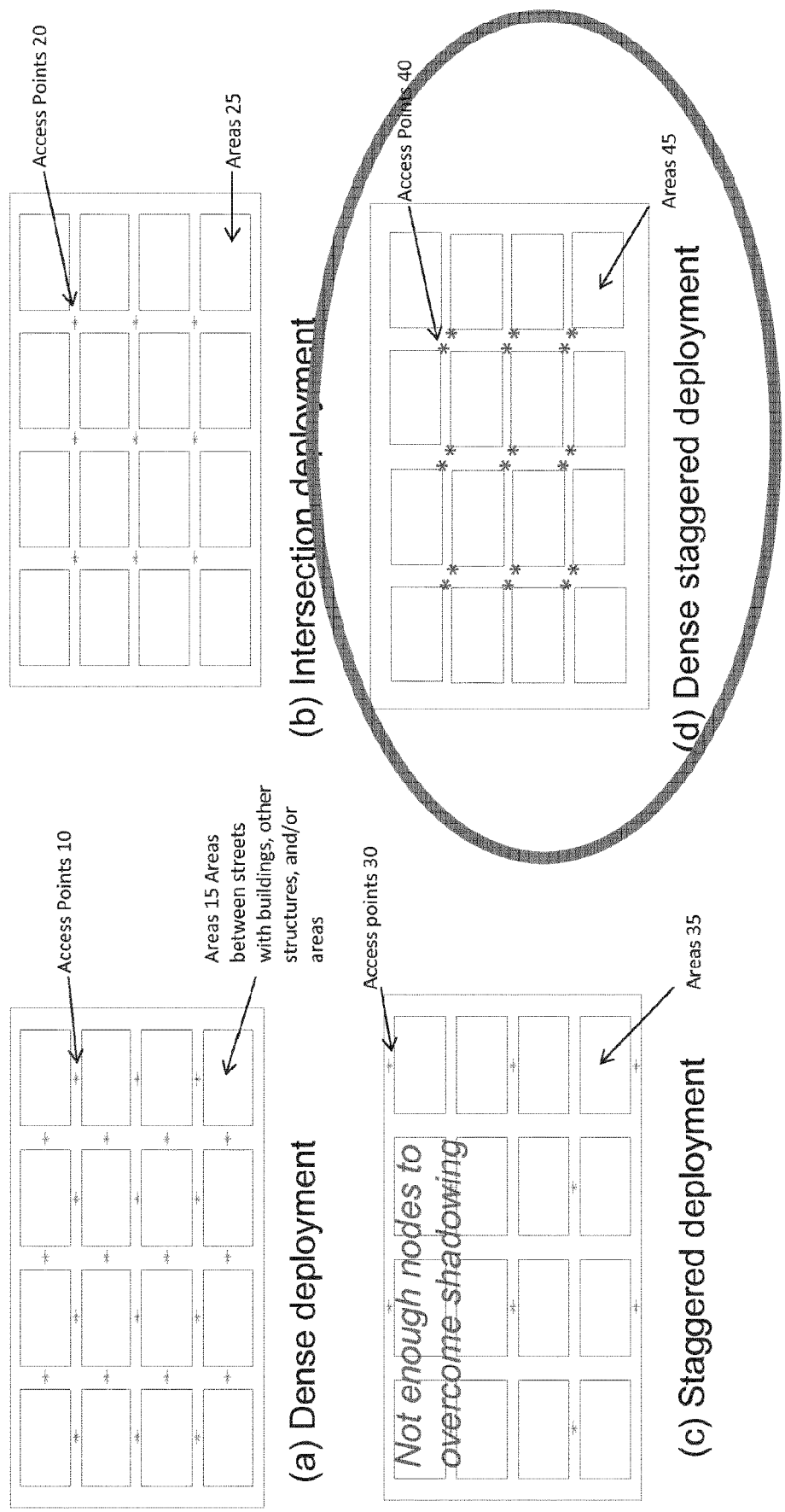
FIG. 1 illustrates different millimeter wave deployments in which the exemplary embodiments of the invention may be used.

In an exemplary aspect of the invention, there is a method comprising: determining a beacon signal for a network node, where the network node is configured to connect with a cluster of access points in a wireless communication network, and where the beacon signal identifies the cluster; and sending the beacon signal towards the wireless communication network.

In an exemplary aspect of the invention, there is an apparatus comprising: at least one processor; and at least one memory including computer program code, where the at least one memory and the computer program code are configured, with the at least one processor, to cause the apparatus to at least: determine a beacon signal for a network node, where the network node is configured to connect with a cluster of access points in a wireless communication network, and where the beacon signal identifies the cluster; and send the beacon signal towards the wireless communication network.

In another exemplary aspect of the invention there is an apparatus comprising: means for determining a beacon signal for a network node, where the network node is configured to connect with a cluster of access points in a wireless communication network, and where the beacon signal identifies the cluster; and means for sending the beacon signal towards the wireless communication network.

In accordance with the exemplary aspect of the invention as described in the paragraph above, the means for determining comprises a computer readable medium embodying computer program code, the computer program code executable by at least one processor; and the means for sending comprises an interface to the wireless communication network.

In another exemplary aspect of the invention there is a method comprising: determining by a mobile apparatus a dominant access point of a cluster of access points based on signaling from at least one access point associated with the cluster of access points; and in response to the determining, directing communications towards the dominant access point of the cluster of access points.

In still another exemplary aspect of the invention there is an apparatus comprising: at least one processor; and at least one memory including computer program code, where the at least one memory and the computer program code are configured, with the at least one processor, to cause the apparatus to at least: determine a dominant access point of a cluster of access points based on signaling from at least one access point associated with the cluster of access points; and in response to the determining, direct communications towards the dominant access point of the cluster of access points.

In yet another exemplary aspect of the invention there is an apparatus comprising: means for determining a dominant access point of a cluster of access points based on signaling from at least one access point associated with the cluster of access points; and means, in response to the determining, for directing communications towards the dominant access point of the cluster of access points.

In accordance with the exemplary aspect of the invention as described in the paragraph above, means for determining and the means for directing comprise a computer readable medium embodying computer program code, the computer program code executable by at least one processor.

DETAILED DESCRIPTION

The exemplary embodiments of this invention pertain generally to access architecture for deployment of cellular radio equipment employing millimeter wave radio spectrum. In accordance with the exemplary embodiment of the invention a set of co-operating access points or a "cluster" of access points is deployed to cover a millimeter wave sized cell (e.g. 100 meter radius) which are chosen to overcome the propagation limitations typical of millimeter wave bands such as shadowing and body loss. These access points will have steerable antenna arrays providing a high directivity gain and a corresponding narrow beam width. Each cluster comprises a grouping of one or more access points with interspersed but over-lapping coverage areas.

New opportunities for cellular expansion exist in bands having frequencies above 6 GHz. Unlike traditional cellular systems, EM waves in these bands (e.g. millimeters wave) do not benefit from diffraction and dispersion making it difficult for them to propagate around obstacles and also suffer higher penetration loss in some materials. For example, penetration loss of concrete block is 10 times higher at millimeter bands as compared to transmission below 6 GHz. As a result, millimeter transmissions are much more likely to encounter shadowing effects than transmission below 6 GHz. Millimeter transmissions also have less favorable link budgets due to lower PA output powers and greater pathloss at these higher frequencies. One advantage of millimeter wave, however, is that the smaller wavelengths allow for the fabrication of antenna arrays having a much higher number of antenna elements in a much smaller area than is typical at microwave bands. Arrays with as many as 8 to 64 elements providing 9 to 18 dB in link budget are envisioned to be typical in the millimeter wave bands. Reliance on these array gains (and the corresponding narrow beamwidths) can make link acquisition and maintenance quite challenging. Traditional cellular systems, such as 3G LTE, cannot simply be upbanded and expected to function in the millimeter bands especially since LTE as currently designed only enables up to 8 transmit antennas. New systems concepts and procedures must be defined to mine this new spectrum resource.

In addition, beamforming may be performed through a weighted combination of radio signals from or to an array of antennas such as an array of antennas for each access point in the millimeter wave spectrum clusters. The beamforming may be done at baseband as is typically in 3G and 4G cellular, or could be done at RF which is likely for millimeter wave communications given the large arrays envisioned. Beamforming is used to create a radiation pattern of the antenna array by adjusting the weights corresponding to each antenna output or input such that the phases of the signals in the direction of the desired sources/targets are added constructively, whereas they can be nullified or mitigated in the directions of undesired/interfering sources/targets. In beamforming, both the amplitude and phase of each antenna element may be controlled. The combined relative amplitude and phase shift for each antenna is called a "complex weight." A beamformer for a radio transmitter applies such a complex weight to transmit the signal thus shifting a phase and setting an amplitude for each element of the antenna array, then summing all of the signals into one that has the desired directional pattern.

A link margin or link budget is an accounting of all of the gains and losses from a transmitter, through the medium, such as an antenna, to a receiver in a communication system. It accounts for the attenuation of the transmitted signal due to propagation, as well as the antenna gains, feed line and miscellaneous losses. Randomly varying channel gains such as fading are taken into account by adding some margin depending on the anticipated severity of its effects.

Still, millimeter wave access architecture presents several unique challenges. As mentioned before, one primary challenge is that millimeter transmissions are more likely to encounter shadowing effects. More particularly, objects in a line of sight or in a path of a millimeter wave communication can cause severe fading and high path loss. In addition, millimeter wave transmissions are susceptible to diffraction and dispersion effects. Such diffraction effects can occur when a millimeter wave transmission wave encounters an obstacle, and dispersion effects are caused for example by component time differences of a millimeter wave. Millimeter wave transmissions tend to not propagate around obstacles and have a high penetration loss in many materials. A penetration loss of a millimeter wave caused by a concrete block, for example, is 10 times higher than that for a microwave transmission.

Millimeter wave transmissions often use narrower beam widths as compared to traditional cellular due to the aforementioned use of arrays having a large number of elements. Employing these large arrays, millimeter wave can be used with high capacity array dimensions envisioned to achieve link budgets. For example, in a millimeter wave array 8 to 64 elements imply 9 to 18 dB link gains. Of course in order to obtain these gains, link acquisition and maintenance is required to track spatial selectivity.

New opportunities for cellular expansion exist in millimeter bands having frequencies above 6 GHz. Unlike traditional cellular systems, EM waves in the millimeters bands do not benefit from diffraction and dispersion making it difficult for them to propagate around obstacles and also suffer higher penetration loss in some materials. As a result, millimeter transmissions are much more likely to encounter shadowing effects than transmission below 6 GHz. Millimeter transmissions also have less favorable link budgets due to lower PA output powers and greater pathloss at these higher frequencies. One advantage, however, is that the smaller wavelengths allow for fabrication of antenna arrays having a much higher number of antenna elements in a much smaller area than is typical at microwave bands. Reliance on these array gains can make link acquisition and maintenance quite challenging. Traditional cellular systems, such as 4G LTE, cannot simply be upbanded and expected to function in the millimeter bands. Hence new systems concepts and procedures must be defined to mine this new spectrum resource.

In addition, current cellular radio standards such as 3GPP LTE provide solutions for frequency bands below 6 GHz which have well known propagation characteristics and typically have no more than 8 transmit and receive antennas. A LTE system which is simply upbanded to 70 GHz would not provide adequate coverage or economy. LTE relies on radio wave diffraction around obstacles and therefore an LTE millimeter wave system would not achieve a reasonable coverage reliability target (e.g. 90% coverage reliability). Similarly, the power efficiency of semiconductor devices is reduced as frequencies above 6 GHz and therefore modulation techniques requiring less linearity should be employed to improve available transmit power. LTE which employs OFDM modulation for DL requires a significant PA backoff making the solution less desirable at 70 GHz.

Local area solutions such as IEEE 802.11ad and IEEE 802.15c exist and define air interfaces for local area access. The solutions are typically targeted to indoor deployments or for personal area networks and hence 10 meter ranges are typical as a solution. These systems will not provide same range, quality of service and coverage reliability required for outdoor access as the proposed invention Therefore to take advantage of millimeter wave technology new solutions are required. As stated above, one cannot simply upband LTE or WCDMA and expect a communication system to function in the millimeter bands. Thus, new systems concepts and procedures must be defined to more fully take advantage of this new spectrum resource.

The exemplary embodiments of the invention provide a method to achieve the benefit of millimeter wave technology with significant reduction in resulting negative effects caused by the millimeter wave propagation, as mentioned above. In accordance with a first embodiment of the invention there is a cluster concept in which multiple access points collaborate to cover an area. In accordance with the embodiments, two or more access points form a cluster to ensure that traffic can be re-routed instantaneously around obstacles. The invention proposes access architecture for deployment of cellular radio equipment employing millimeter wave radio spectrum.

In accordance with the exemplary embodiments, there is a set of co-operating access points or cluster of access points deployed to cover a millimeter wave sized cell (e.g. 100 meter radius) and overcome the shadowing/body loss typical of millimeter wave bands. These access points will have steerable antenna arrays providing a high directivity gain and a corresponding narrow beamwidth.

FIG. 1 illustrates different types of millimeter wave access points deployment scenarios in which the exemplary embodiments of the invention can be implement to an advantage. FIG. 1(a) illustrates a dense deployment of access points 10 and areas 15. It is noted that areas 15 identifies areas between streets, such areas which may be fully or partially occupied with buildings or other structures which could result in obstruction of millimeter wave signaling. Further, it is noted that, similarly, the streets can also include objects such as vehicles and structures which can also result in obstruction of millimeter wave signaling. FIG. 1(b) illustrates an intersection deployment of access points. Though these types of deployments can provide coverage, these deployments may still be subject to the millimeter wave type propagation difficulties because in many locations only two access points are visible to a user. FIG. 1(c) illustrates access points 30 arranged as a staggered deployment model which would be most susceptible to at least the shadowing effects as discussed above caused at least by the areas 35 since in many locations only a single access point would be visible to a user. Further, the exemplary embodiments of the invention can be used to the benefit this staggered deployment as well. FIG. 1(d) illustrates a dense staggered deployment in accordance with the exemplary embodiments of the invention. In FIG. 1(d) the access points 40, as illustrated with asterisks, are located between the building 45 on opposite sides of the street thus enabling a user to see at least three access points at any location. This novel dense staggered deployment can be used, in accordance with the exemplary embodiments, to provide a millimeter wave communication environment with significantly improved coverage and communication capabilities. The reason being that even if two access points become blocked or shadowed at a user location, then the user will still have the opportunity to connect to a third access point which is not blocked or shadowed. Of course the access point density can be increased even further thus improving the coverage, but going beyond having three access points being potentially accessible to a user would likely have diminishing returns.

Further, in accordance with the exemplary embodiments, link maintenance mechanisms will be employed to simultaneously detect all subscribers within the coverage area and also determine a direction to these subscribers to enable rapid rerouting of the link in case shadowing imposed by motion of the subscriber and/or the environment. Likewise, the subscribers will also detect all access points in range and record a direction to these access points such that the subscriber may initiate rapid rerouting of the radio link. The rapid rerouting, as will be discussed in more detail below, is achieved by switching the beams instantaneously from the subscribers to the new access points or vice-versa.

The term "detect" in this invention refers to the ability of the one device to determine the presence of the other device. An access point would determine the presence of a subscriber station or a subscriber station would determine the presence of access point or cluster of access point in aggregate. As one skilled in the art would be aware, that one way detection might be accomplished by correlating with a known waveform, such as an access request waveform and/or a beacon signal as discussed herein, and comparing the output to a threshold.

The term "direction" in this invention is used to describe the configuration of the antenna array or the "beamforming" of the array in the direction of the corresponding device. Beamforming may be performed through a weighted combination of radio signals from or to an array of antennas such as an array of antennas for each access point in the millimeter wave spectrum clusters. The beamforming may be done at baseband as is typically in 3G and 4G cellular, or could be done at RF which is likely for millimeter wave communications given the large arrays envisioned. Beamforming is used to create a radiation pattern of the antenna array by adjusting the weights corresponding to each antenna output or input such that the phases of the signals in the direction of the desired sources/targets are added constructively, whereas they can be nullified or mitigated in the directions of undesired/interfering sources/targets. In beamforming, both the amplitude and phase of each antenna element may be controlled. The combined relative amplitude and phase shift for each antenna is called a "complex weight." A beamformer for a radio transmitter applies such a complex weight to transmit the signal thus shifting a phase and setting amplitude for each element of the antenna array, then summing all of the signals into one that has the desired directional pattern. Therefore, the "direction" can refer to a set of complex weights for the given antenna array that improve the link margin of the transmission between the subscriber station and access point and/or vice versa.

The exemplary embodiments of the invention can be used to benefit deployments of high rate/frequency spectrum communications for microcell/picocell networks deployed either outdoors or indoors. The high rate/frequency spectrum allows the system to employ bandwidths 10 times greater than traditional cellular bands. For example, 2 GHz bandwidths may be employed allowing for peak data rates as high as 10 Gbps.

Figure 2:
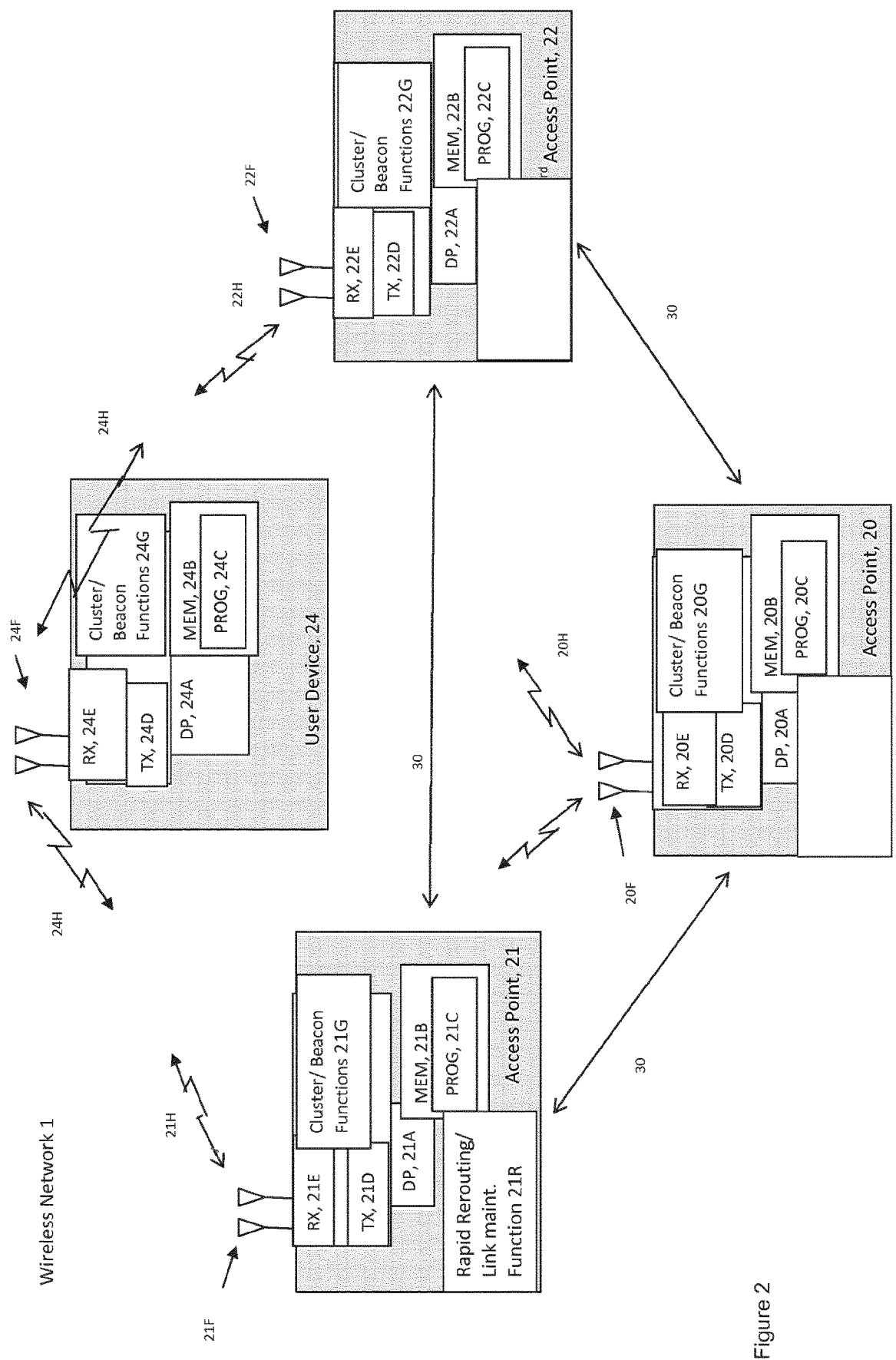
FIG. 2 illustrates a simplified block diagram of exemplary electronic devices that are suitable for use in practicing various exemplary embodiments of this invention.

A reference is now made to FIG. 2 for illustrating a simplified block diagram of various electronic devices and apparatus that are suitable for use in practicing the exemplary embodiments of this invention. FIG. 2 illustrates a wireless network 1, which may be a millimeter wave network, or a network including a different wireless communication type or a combination of wireless communication types, any of which would benefit from the invention. In FIG. 2 access points 20, 21 and 22, or other network nodes, are adapted for communication over a wireless link (not specifically shown) with mobile apparatuses, such as mobile terminals, UEs or user devices 24. The access points 20, 21 and 22 can include WLAN access points, base stations, and/or any WiFi devices enabled to operate using millimeter wave or other wireless communication signaling in accordance with the exemplary embodiments of the invention as described below. The UEs or user devices 24 can be any device in the wireless network 1 enabled to operate in accordance with the exemplary embodiments of the invention as described above. It is noted that the user devices 24 as described herein may be referred to in a non-limiting manner as subscriber stations. The access points 20, 21 and 22 may be embodied in a network node of a communication network, such as embodied in a base station of a cellular network or another device of the cellular network. Similarly, the access points 20, 21 and 22 can be configured to perform internet protocol communications and/or routing function. In one particular implementation, any of the access points 20, 21 and 22 may be embodied as a WLAN station STA, either an access point station or a non-access point station, or may be incorporated in a cellular communication device. It is noted that the access points 20, 21, and/or 24 described herein may be referred to in a non-limiting manner as access points.

The access point 20 includes processing means such as at least one data processor (DP) 20A, storing means such as at least one computer-readable memory (MEM) 20B storing at least one computer program (PROG) 20C, and may also comprise communicating means such as a transmitter TX 20D and a receiver RX 20E for bidirectional wireless communications with the user device 24 via one or more antennas 20F. The RX 20E and the TX 20D are each shown as being embodied with a modem 20H in a radio-frequency front end chip, which is one non-limiting embodiment; the modem 20H may be a physically separate but electrically coupled component. Further, the access point 20 incorporates a cluster/beacon functions 20G which is coupled to at least the DP 20A, the MEM 20B and the PROG 20C of the access point 20. The cluster/beacon functions 20G to be used to perform operations of at least processing the access waveforms and other operations, as in accordance with the exemplary embodiments of the invention as at least described herein.

The network node 21 similarly includes processing means such as at least one data processor (DP) 21A, storing means such as at least one computer-readable memory (MEM) 21B storing at least one computer program (PROG) 21C, and may also comprise communicating means such as a transmitter TX 21D and a receiver RX 21E for bidirectional wireless communications, such as millimeter wave communications, with other apparatus of FIG. 2 via one or more millimeter wave capable antennas 21F. Using the cluster/beacon functions 21G, the access point 21 is at least enabled to perform the exemplary operations including at least processing the waveforms signaling communicated via the antennas 21F and performing the operations as in accordance with the exemplary embodiments of the invention, as described above, such as from any of the other devices as illustrated in FIG. 2.

Similarly, the access point 22 includes processing means such as at least one data processor (DP) 22A, storing means such as at least one computer-readable memory (MEM) 22 storing at least one computer program (PROG) 22C for processing of bidirectional signaling such as signaling received or transmitted via the capable antennas 22F, in accordance with the exemplary embodiments. Similar to the user device 21 the access point 22 is at least enabled, using the cluster/beacon functions 22G, to perform the operations including at least interfacing with the antenna 21F to process the waveforms and perform the operations, in accordance with the exemplary embodiments of the invention.

The user device 24 includes its own processing means such as at least one data processor (DP) 24A, storing means such as at least one computer-readable memory (MEM) 24B storing at least one computer program (PROG) 24C, and may also comprise communicating means such as a transmitter TX 24D and a receiver RX 24E and a modem 24H for bidirectional wireless communications with devices 20, 21, 22 and 24 as detailed above via its antennas 24F. Thus, similar to the user devices 21 and 22 the user device 24 is at least enabled, using the cluster/beacon function 24G, to perform the operations including processing of bidirectional signaling received or transmitted via the antennas 24F, in accordance with the exemplary embodiments of the invention. In addition, while the access points 20, 21, and 22, and user devices 24 are discussed with respect to the access points 20, 21, and 22 acting as a centralized node, the disclosure included herein may also apply to mesh networks.

The access points 20, 21, and/or 22 are considered to be part of a cluster of access points in the wireless network 1. Further, the access points 20, 21, and/or 22 of the cluster are overlapping coverage of an area of the wireless network 1 where the user device 24 is located. In addition, illustrated lines 30 between the access points 20, 21, and 22 represent backhaul links. The backhaul links 30 may be wired and/or wireless. The backhaul links 30 are used at least to allow communication between the access points of the cluster in accordance with the exemplary embodiments of the invention.

In addition, as illustrated in FIG. 2 the access points 20, 21, and 22 include a rapid rerouting and link maintenance function 20R, 21R, and 22R, respectively. These functions are configured to perform at least the rerouting and/or link maintenance operations in accordance with the exemplary embodiments. Further, any of the cluster/beacon functions or the rerouting and link maintenance functions may be performed by another device in the wireless network 1. As similarly stated above, although the embodiments of the invention may be described with regards to a millimeter wave spectrum, this is non-limiting and the invention can be used to benefit any wireless communication type. In addition, although three access points are illustrated in FIG. 2, this is non-limiting and the invention may be practiced using less or more access points.

At least one of the PROGs 20C, 21C, 22C and 24C configured in the devices 20, 21, 22 and 24 are assumed to include program instructions that, when executed by the associated DP 20A, 21A, 22A and 24A enable the respective device to operate in accordance with the exemplary embodiments of this invention, as detailed below. Blocks 20G, 21G, 22G and 24G summarize different results from executing different tangibly stored software to implement certain aspects of these teachings. In these regards the exemplary embodiments of this invention may be implemented at least in part by computer software stored on the MEM 20B, 21B, 22 and 24B which is executable by the DP 20A, 21A, 22A and 24A of the respective other devices 20, 21, 22 and 24 or by hardware, or by a combination of tangibly stored software and hardware (and tangibly stored firmware). Electronic devices implementing these aspects of the invention need not be the entire devices as depicted at FIG. 2, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 21B, 22 and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 21A, 22A and 24A include but are not limited to general purpose computers, special purpose computers, microprocessors, digital signal processors (DSPs) and multi-core processors.

Cluster Concept

A cluster of access points provides a novel solution to address coverage reliability especially for cellular systems operating in the millimeter waves. Specifically, the deployment of clusters of multiple access points mitigates the shadowing caused by opaque objects at millimeter waves such as trees, cars, people, etc. If a line-of-sight is not visible to one access point, then it is very likely visible to another access point in the cluster. The greater density of the cluster improves the coverage reliability of the system. The access points of each cluster are configured to interconnect such that each cluster is able to avoid these millimeter wave opaque objects. A cooperating cluster of aspect points are arranged such that these shadowed regions are covered from a unique propagation direction. Further, in accordance with the embodiments the interconnecting is performed using wired backhaul and/or wireless links that have line-of-sight above any clutter. The wireless links can be inband or out-of-band.

In accordance with an exemplary embodiment of the invention, at least network nodes 20, 21 and 22 are clustered at a location of a millimeter wave deployment scenario to at least provide an interspersed coverage area. The exemplary cluster may include any or all of the following:

two or more network nodes and/or access points with interspersed coverage areas;
two or more network nodes and/or access points cells arranged in geometrical (for example rectangular or square) grid;
each network nodes and/or access points has one or more high gain antenna arrays;
multiple discrete antenna arrays may be combined into one network node and/or access point;
multiple antenna arrays may be combined to provide broad (e.g. omnidirectional) coverage;
multiple antenna arrays may be combined to form a higher gain directional antenna;
the operating frequency will be above 6 GHz; and/or
network nodes and/or access points that are interconnected by high speed backhaul links. It is noted that these links may be wireless and also in the millimeter waves.

Further, in accordance with the exemplary embodiments of the invention, subscriber stations or user equipment will:

have an operating frequency that is above 6 GHz;
employ high gain antenna arrays similar to the access point;
employ multiple arrays to combat blockage (human or otherwise) of the arrays on the subscriber device and/or
manage power consumption by controlling the number of active array elements depending on the channel condition and required bandwidth needed.

The cluster of access points will need to be detected by the subscriber stations which reside in the coverage area that the cluster serves. A method of detecting the cluster may be accomplished through means of a "beacon". The beacon may either be broad beacon or a swept beacon. One unique aspect with respect to millimeter-wave operation is that cluster's beacon must overcome a lack information, with respect to direction, at both the access point and subscriber station. The "directivity" is used to configure the adaptive antenna array such that link gain is experience improving the link budget to acceptable levels. It is well known that the link gain enjoyed comes at the expense of antenna beamwidth. A higher link gain reduces the antenna beamwidth and effectively limits the coverage of the transmission.

A broad beacon may be employed by the cluster to increase the coverage of the beacon at the expense of link gain. As such, the broad beacon would need to reduce required link margin by reducing the data rate. The reduction in data rate may be achieved through repetition coding, spread spectrum, a reduced symbol rate or some other means. At this lower data rate combined with a broader coverage area each access point, or the cluster of access points in aggregate, may be more reliability detected.

A swept beacon may be employed by the cluster to span the coverage area of the cluster without a loss in link gain. In this case, the access points would need to cycle between different combinations of antenna weights so that any subscriber in the coverage area would have an opportunity to detect the beacon regardless of what region it resides in. The swept beacon effectively repeats the beacon signal with differing antenna weights until it happens upon a set of antenna weights that is effective for the subscriber station. The selection of antenna weights that the swept beacon uses may be achieved in a number of methods. For example, an access point in the cluster may divide the coverage area into several sectors and then select weights to cycle through those sectors. Each sector would represent a reduced coverage area that temporarily receives a higher link gain.

A subscriber station would also have to be detected by the cluster of access points with of which the subscriber station has detected. The subscriber station would need to employ some access waveform to overcome the lack of knowledge at the access points regarding the subscriber stations position and its effective directivity. The "directivity" is used to configure the adaptive antenna array at the access point to receive uplink transmission such that the link budget is improved to acceptable levels.

Beacon WaveForm Concept

In accordance with the exemplary embodiments of the invention, a beacon waveform is broadcast by any or all of the network nodes 20, 21 and 22. The beacon waveform:

provides a means for subscriber stations to detect the access point(s) and dominant rays;
may use a broad beam pattern;
may be simulcast from multiple access points; and/or
may be a swept directional beacon.

In accordance with the exemplary embodiments of the invention, a beacon wave form is broadcast by each access point in the millimeter wave cluster. The broadcasting of the beacons from the access points may occur at the same time or may be staggered at different times for each access point. The beacon wave can be broadcast on a downlink, for example as part of a downlink frame. The beacon wave form provides a means for each of the subscriber station(s), such as user device(s) 24 to detect access points such as network nodes 20, 21, and 22 within the cluster or even in neighboring clusters. The beacon wave form(s) may be broad (e.g. omni directional), and/or may be a simulcast from multiple access points. Further, the broadcast waveform may include a swept directional beacon. In addition, the exemplary beacon waveform can be used by the subscriber stations to determine the dominant or a preferred access point for the subscriber station to use for the access. The beacon waveforms can also be used by the subscriber station to keep a list of potential access points to communicate with (including access points in other clusters) thus assisting a fast switching mechanism between access points should the signal to the preferred access point get blocked or shadowed.

In accordance with the exemplary embodiments, a simulcast beacon waveform using unique signature can be sent at a low frequency rate and/or can be a low power signal from the access points. The subscriber station is configured to use the beacon(s) to detect a presence or the cluster and/or access point(s) of the cluster. In addition, the beacon can be used by the subscriber station(s) to determine a level of strength of a multi-path ray(s) and/or signal(s) between the subscriber station(s) and the access point(s). Also the exemplary beacon waveform can also be used by subscriber stations to determine a direction to point a beam (i.e., transmit or receive) with its antenna array. The beacon waveform may also consist of multiple beacons which scan various directions (i.e., beacons or signals sent in multiple directions from the access points array) thus enabling the subscriber to pick a best beacon. The subscriber station may feedback this best beacon information to the access point thus teaching the access point the best direction to point its antenna array beam for that particular subscriber station.

Swept Beacon Concept

In accordance with an embodiment of the invention cell selection can be performed in a multimedia wave access architecture using a swept beacon procedure. In swept beacon procedure an access point will sweep through several beamforming weights (i.e., directions or beams) to enable the subscriber station to determine the best direction the access point should transmit or receive to the subscriber station. This Swept Beacon Concept may be one non-limiting embodiment of the Beacon Waveform Concept, as described above.

Figure 6:
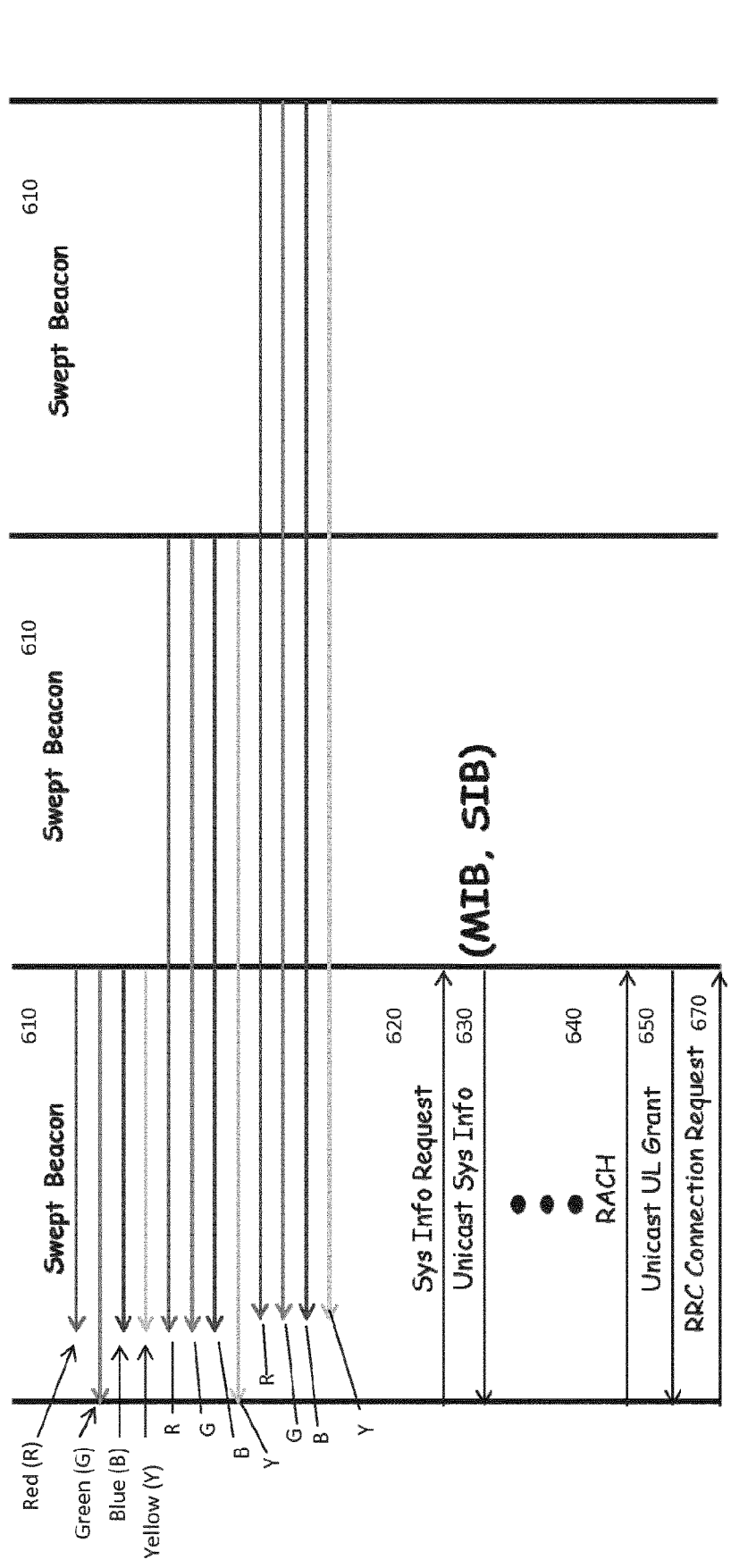
FIG. 6 illustrates millimeter wave access architecture cell selection with swept beacon in accordance with the exemplary embodiments of the invention.

Referring to FIG. 6, a Message Sequence Diagram illustrates four sets of beamforming weights per Access Point (red (R), green (G), blue (B), yellow (Y)). In practice, there may be many more sets of weights (e.g., 75). Although depicted as sequential, neighboring access points can step through their antenna weights simultaneously. In accordance with the embodiments, neighboring access points can coordinate their beams so they do not overlap by changing the order of beamforming weights (green, yellow, blue red), using different weights (purple, turquoise, magenta, orange), or by combination subscriber station location, access point location and beamforming direction. A subscriber station will detect the beacon when the weights provide sufficient link margin (i.e., when the beacon points toward the subscriber station or towards a favorable reflection). It is noted that not all directions will be detectable by the subscriber station given the nature of the millimeter wave propagation. Though multiple directions should be detectable the subscriber will need to identify the best one (e.g., by choosing the one with the highest received power). Subscriber stations may also need to identify a receive direction from the base station (e.g., the subscriber station could sweep it's receive weights multiple times for a single beacon direction at the access point), and access points may have to sweep receive weights to receive the subscriber station's initial transmission. In accordance with the exemplary embodiments, the method performed in cell selection and access is similar to the simulcast beacon as mentioned above. Subscriber stations may also maintain a list of the unobstructed and hence best access points to communicate along with the corresponding transmit weights (e.g. based on a preset SNR threshold).

Access Waveform Concept

In accordance with the exemplary embodiments of the invention, an access waveform may be sent to the cluster from the subscriber stations. The access waveforms:

provides a means for the cluster (access points) to detect the subscriber station;

may be broad beamed (e.g. omnidirectional); and/or may be swept directional beacon In accordance with the exemplary embodiments of the invention there are means for each cluster and/or each access point to detect subscriber station(s) using access waveforms received from the subscriber stations. The access waveform(s) may have a wide beamwidth (e.g. omni directional) and/or may be a swept directional beacon. In addition to detection, the exemplary access waveform may be used by the subscriber stations to request uplink resources to be able to transmit uplink information.

As in the case of the beacon waveform, the exemplary access waveform can also be used by the receiving access points to determine a direction to point (i.e., transmit or receive) its antenna array. The access waveform may also consist of multiple beacons which are beamformed to scan various directions thus enabling the access point or points to pick a best beacon. An access point may then feedback this best beacon information to the subscriber station, thus teaching the subscriber station the best direction to point its antenna array beam for the particular access point.

Rapid Rerouting Concept

Further, in accordance with the exemplary embodiments of the invention, there is a method of rapid rerouting which includes subscriber initiated rapid rerouting and/or cluster initiated rapid rerouting.

In accordance with the exemplary embodiments of the invention, the subscriber stations and/or the access points are configured to perform rapid rerouting in the case of signal disruption and/or failure. Such disruption or failure can be the result of the adverse propagation effects as discussed herein.

Rapid rerouting relies on "Directivity Link Maintenance Algorithms" that enable to both the subscriber station and cluster to keep track of the direction between subscriber station and the non-shadowed access points.

Figure 3A:
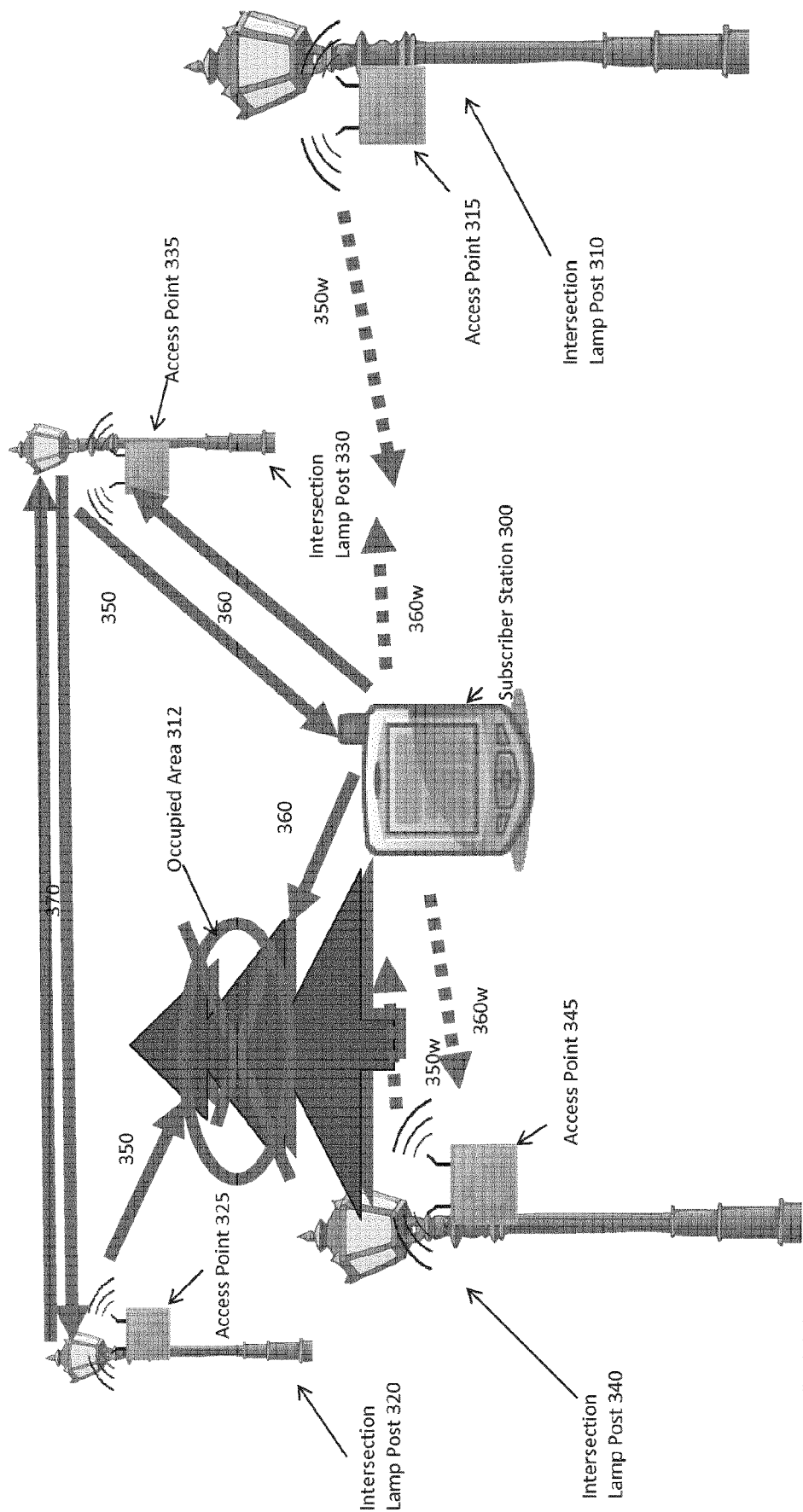
FIG. 3A illustrates subscriber initiated rapid rerouting in accordance with the exemplary embodiments of the invention.

FIG. 3A illustrates a scenario where a subscriber station, such as a user device 24, initiates rerouting of a millimeter wave transmission via a different access point of the cluster.

Subscriber Initiated Rapid Rerouting

FIG. 3A illustrates a subscriber station 300 in a millimeter wave deployment cluster. The subscriber station 300 is first attempting to start or continue a communication with an access point 325 at the intersection lamp post 320 of the cluster. Say that the communication with the access point 325 is disrupted or fails. This communication problem can be the result of shadowing or penetration loss, as discussed above. In accordance with the exemplary embodiments of the invention, the subscriber station 300 is receiving beacon waveforms 350 from access points 315, 335, and 345. As shown in FIG. 3A the beacon waveform 350 from the access point 325 is blocked by a tree in the occupied area 312. In addition, it is noted that access waveforms from the subscriber station 300 are reaching the access points 315, 335, and 345, but not to access point 325. However, the beacon waveforms received by the subscriber station 300 from the access points 315 and 345 are weak and/or including errors.

In accordance with the exemplary embodiments of the invention, the subscriber station 300 is configured to determine that the access point 335 is a better alternative for rapid rerouting. The access point 335 has unobstructed signaling with both the access point 325 and the subscriber station 300. The subscriber station 300 is configured to use at least the beacons 350 and 350w to determine that access point 335 is dominant. In other words the subscriber station may maintain a list of the unobstructed and hence best access points to communicate with if there is a failure in the primary communication link. The list may be simply determined as choosing the strongest received channel ray to each access point where that ray could even be a reflected ray and not a direct line of sight ray. The list may also contain a direction to point the antenna array to the access points in the list and may even further contain a the direction the access point should point its antenna array (e.g., as determined from the beacon waveforms). The list may alternatively indicate an identifier of the preferred beam out of a set of possible beams, where each beam has a different direction and possibly a different beamwidth. Thus, in accordance with the exemplary embodiments, in this example, the subscriber station 300 initiates a rapid rerouting to the access point 335 communicates with the access point 325. Rapid rerouting signifies rapid change in beam direction by quickly adjusting the beam weights.

Cluster/Access Point Initiated Rapid Rerouting

Figure 3B:
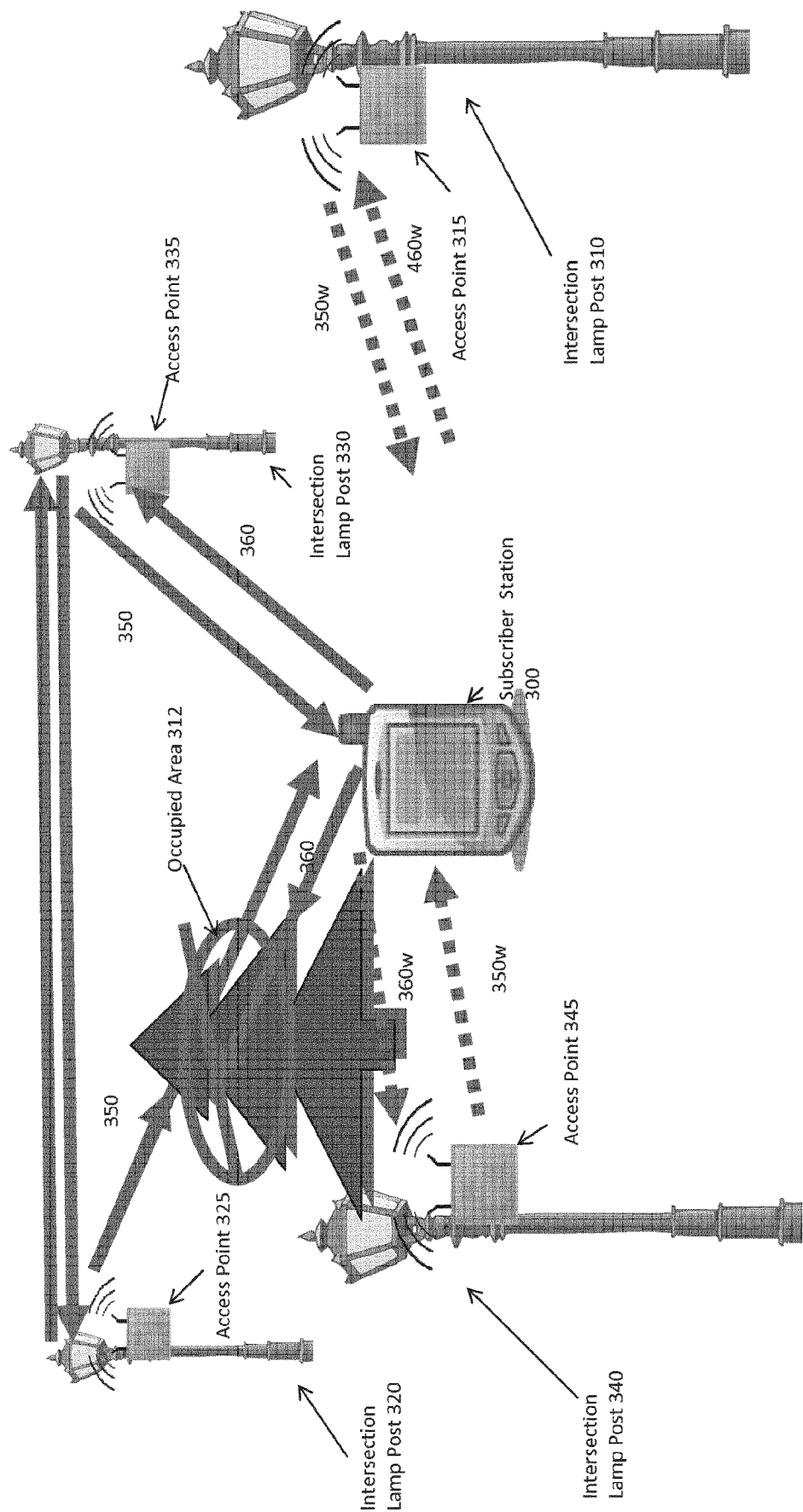
FIG. 3B illustrates access point initiated rapid rerouting in accordance with the exemplary embodiments of the invention.

As illustrated in FIG. 3B, the access point 325 at the intersection lamp post 320 of the cluster is intending to start or continuing a communication with subscriber station 300. The communication with the subscriber station 300 is disrupted or fails. This communication problem can be the result of diffraction and dispersion effects, as discussed above. In accordance with the exemplary embodiments of the invention, it is determined that the access points 315, 335, and 345 are receiving access waveforms 360 from the subscriber station 300. However, an access waveform 360 from the subscriber station 300 is blocked by an obstacle (e.g. tree) in the occupied area 312. In addition, the access waveforms 360w received at the access points 315 and 345 are weak and/or including errors.

In accordance with the exemplary embodiments of the invention, the subscriber station 300 is configured to determine that the access point 335 is a better alternative for the rerouting. The subscriber station 300, in accordance with the exemplary embodiment of the invention, is configured to use at least the beacons 350 and 350w to determine that access point 335 is dominant. As an alternative, the access points themselves can determine that the dominant access point for the subscriber station 300 is 335 by using access waveforms sent from the subscriber station 300. The access point 335 has unobstructed signaling with both the access point 325 and the subscriber station 300. Thus, in accordance with the exemplary embodiments, in this example, the access point 325 initiates a rapid rerouting procedure to the access point 335 based on the determining in order to communicate with the subscriber station 300. The decision to initiate rapid rerouting may not be in the access points themselves but in an aggregator which they all communicate with through the aforementioned backhaul link.

In determining the dominant access point for rapid rerouting for each subscriber station communicating with the cluster, the access points must identify all active subscriber stations that are visible. In addition the access points must at least have a coarse measure of the direction to the subscribers so that the dominant access point which has the blocked communication link redirected to is able to rapidly point its array to the subscriber station. The list may also contain the best direction the subscriber station should point its array (e.g., as learned from the access waveform) so that it can inform the subscriber station how its antenna array beam should be pointed. Alternatively, rather than maintaining a direction, the list may contain an indicator of the preferred beam out of a set of possible beams, where each beam in the set has a different pointing direction and possible different beamwidths. All the above features enables, rapid rerouting of the signals.

Further, it is noted that the various embodiments of the user device 24 or the subscriber station 300 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

FIG. 4 illustrates an example frame structure 400 in accordance with the exemplary embodiments of the invention. As shown in FIG. 4 a beacon, as indicated by "S", is transmitted in a superframe every 20 ms. In this example the beacon has a TDD Frame 410 of 1 ms but in other embodiments the beacon may span only a portion of the TDD frame. The TDD frame 410 includes a TDM slot 420 of 0.1 ms. The TDM slot 420 includes a data plus pilot symbol 430 and a Kth data symbol 440. The beacon may consist of a single broad beamwidth (e.g. omni-directional) beacon which all subscriber stations will receive at the same time or may be multiple directional beacons scanned with a narrow beam created with the antenna array.

Figure 5A:
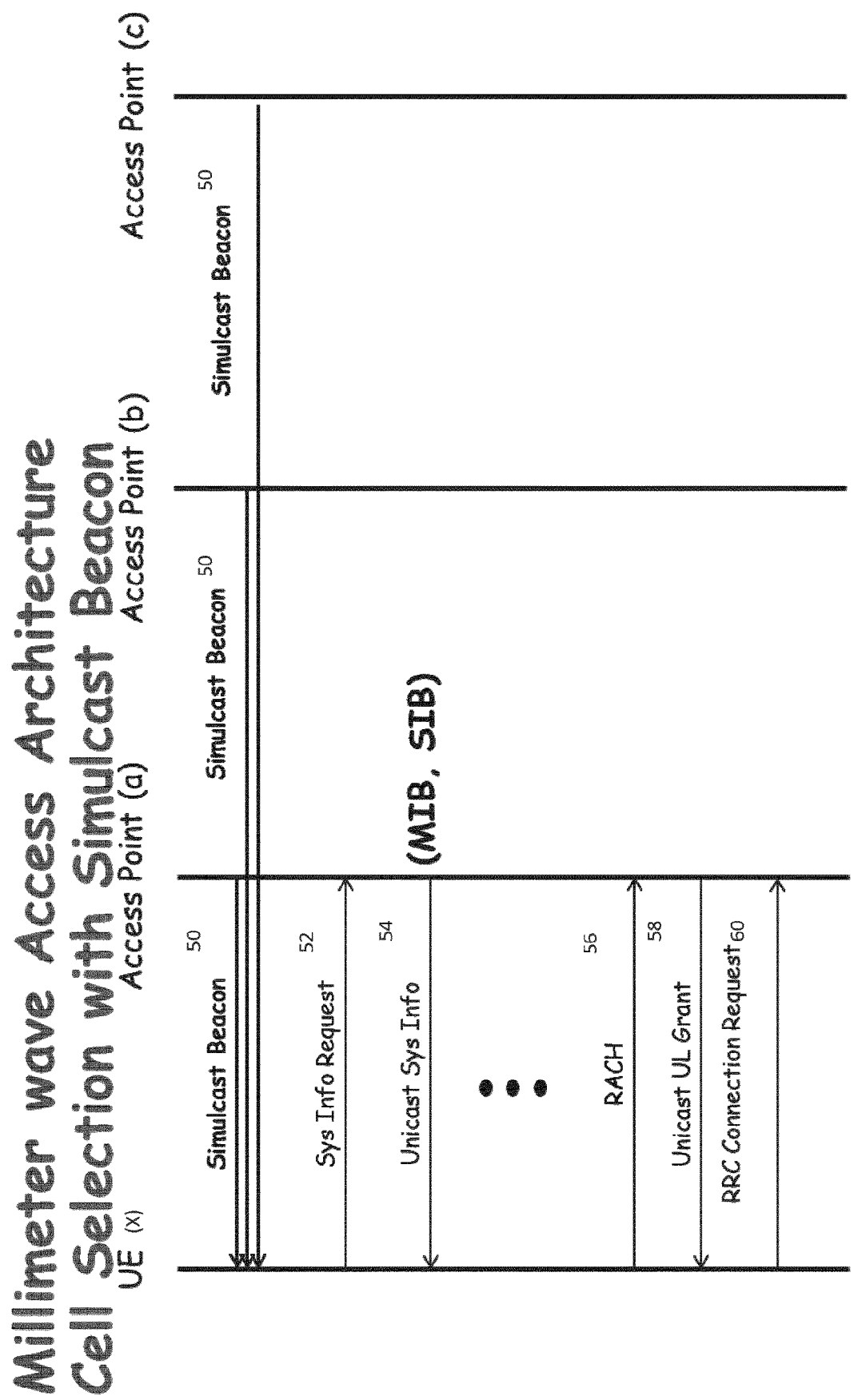
FIG. 5A illustrates millimeter wave access architecture cell selection with simulcast beacon in accordance with the exemplary embodiments of the invention.

Referring to FIG. 5A there is illustrated a simulcast beacon waveform, in accordance with the exemplary embodiments of the invention. As shown in FIG. 5A, at step 50 access points a, b, and c of a cluster each simulcast their own beacon waveforms to user equipment X, subscriber station or other device. The subscriber Station will detect the simulcast beacon and use it to identify the presence of the cluster. In accordance with the exemplary embodiments, the simulcast beacons from the access points a, b, and c may be broadcast in a message which identifies the cluster. Examples of values that can be encoded into a simulcast beacon and/or a broadcast message include:

CID—Cluster Identifier which may have the following properties:
The CID may be a number (e.g., a 10 bit number) uniquely identifying the cluster from neighbor clusters.
the CID may be for a geographic area where the system information is constant.

The CID could be signaled through optional spreading codes.

The CID could be some other unique waveform (like a generalized chirp-like sequence as known in the art) which uniquely identifies a cluster.

PI—Paging Indicator

PI can be a way of signaling incoming calls;

PI could also be signaled through orthogonal spreading codes (or thorough a mechanism like the generalized chirp-like sequence);

PI can divide subscriber stations into paging groups 1-bit PI indicator that a group page is coming PI will cause UEs in the paging group will RACH to see if it is for them; and/or MIB—Master Information Block MIB provides at least bare minimum system information required by device so that the device can start communicating with the system.

Again referring to FIG. 5A, at step 52 the subscriber station transmits a system information request message to the cluster. This system information request message would be transmitted in a pre-determined contention slot which can be known by the subscriber Station. Optionally, the location could be specified in the simulcast beacon. In accordance with the embodiments, the information request would act as a channel sounding signal to the cluster.

One or more of the access points a, b, and c in the cluster would detect the system information request. In accordance with the exemplary embodiments, the access points may collaborate, such as via a back haul link or a wireless link, to determine which access point has the best path to the subscriber station, and thus is dominant. In step 54 the cluster unicasts the system information to the subscriber station. It is noted that unicast in this context means that the system information would be directed to insure reception by the requesting user equipment X. In accordance with the exemplary embodiments, multiple access points may be simultaneously responding to the system information request. Multiple responses can be combined constructively at the subscriber station as a means to overcome high path loss. Then, once the system information is received by the subscriber station, it may proceed with further aspects of the access protocol such as a random access channel (RACH) as shown at step 56, UL grants at step 58, and radio resource control signaling (RRC) connect requests at step 60.

It is noted that can be a master information block (MIB) carried on a physical broadcast channel (PBCH). The MIB for use in determining cell bandwidth, information about physical hybrid automatic repeat request (HARQ) indicator channel (PHICH), and a single frequency network (SFN). In addition, LTE utilizes a synchronization channel which includes a primary synchronization sequence. The sequence allows for slot timing, and physical Layer identification (0, 1 or 2). Further, in LTE there is a secondary sync sequence which can be used for radio frame timing, Cell ID group, for example: [0 . . . 167], (by relative frequency shift of component sequences), determining cyclic prefix (CP) length (by position), and time division duplex/frequency division duplex (TDD/FDD) detection (by position of secondary synchronization signal (SSS)). Further, regarding LTE systems FIG. 9 illustrates an ASN.1 description of an MIB and FIG. 10 illustrates LTE SystemInformationBlock Types 1-8.

In accordance with another exemplary embodiment of the invention, the beacons, such as simulcast beacons, from access points in a cluster can be used to perform link maintenance. In accordance with the exemplary embodiments of the invention the subscriber station can monitor the cluster to perform link maintenance. When in an active mode the monitoring by the subscriber station will detect a beacon and cluster every superframe; and/or identify alternate multipath rays for potential rerouting.

In addition, in accordance with the exemplary embodiments of the invention, the subscriber device can transmit an uplink beacon or transmit a waveform that could be similar to the cluster's beacon waveform. In accordance with the exemplary embodiments, this beacon can be transmitted with broad effective antenna pattern (e.g. omni-directional) using a known sequence so that all access points can detect it at one time. In addition, the beacon can be encoded with a subscriber station identity, such as into the broad beamwidth beacon so that access points can associate a detected beacon with a particular subscriber. Further, the beacon could be transmitted in a dedicated link maintenance subframe or timeslot. The access waveform could even be transmitted directionally to the dominant (or preferred) access point through use of beamforming on the subscriber station's array. In this case less interference is seen system-wide but there is the potential for a link blockage where the subscriber station would need to retransmit an access waveform (possibly omni-directionally) after some timeout period.

Further, in accordance with the exemplary embodiments of the invention the access points, or network nodes, of the cluster can perform access point link maintenance. In accordance with the exemplary embodiments an access point serving in a cluster can assign a link maintenance timeslot for all active subscriber stations. This timeslot could be in a dedicated portion or subframe of the beacon waveform. Each access point will share the assigned position of the link maintenance time slot with neighboring access points in the cluster. The link maintenance timeslots are used by the access points to identify and share the identity of the subscriber station using the timeslot. Alternatively the assignment of link maintenance timeslots can be coordinated using a common cluster controller. In accordance with the exemplary embodiments of the invention, all access points are able to detect all subscriber stations visible during a link maintenance interval. Further, the exemplary embodiments of the invention allow the access point to also record a direction of the strongest rays received from that subscriber station in the cluster. Alternatively, rather than recording a direction, the best beam out of a set of beams for receiving from that subscriber can be recorded.

Directivity Link Maintenance Algorithms for Use in Millimeter Wave Cluster Deployments In accordance with the embodiments of the invention, the subscriber stations and/or the access points are configured to utilize a directivity link maintenance algorithm which includes the ability to:

maintain a list of visible clusters to each subscriber;

maintain a list of viable paths (i.e. directions to the cluster and/or directions/preferred beams for the subscriber stations); and/or employ a protocol to update the detected clusters and corresponding directions Further, in accordance with the embodiments of the invention, the subscriber stations and/or the access points are configured to utilize a cluster link maintenance algorithm and/or a cluster which provides the ability of the device to:

maintain a list of visible subscriber stations from each access point;

maintain a list of viable paths (i.e. directions to each access point and/or directions/preferred beams for each subscriber station)

employ a protocol to update the detected subscriber stations and corresponding directions/beams; and/or maintain a maximum latency requirement within the cluster by managing the use of viable paths In accordance with the exemplary embodiments of the invention, the subscriber stations and/or the access points are configured to utilize a subscriber link maintenance algorithm which can be used to:

maintain a list of visible clusters;

maintain a list of viable paths (i.e. directions to the cluster and/or directions to the subscriber stations, or similarly preferred beams for the cluster and preferred beams for the subscriber stations); and/or employ a protocol to update the detected clusters and corresponding directions In accordance with the exemplary embodiments of the invention, the subscriber stations and/or the access points are configured to utilize a cluster link maintenance algorithm which can:

maintain a list of visible subscriber stations from each access point;

maintain a list of viable paths (i.e. directions to each access point and/or from each subscriber station);

employ a protocol to update the detected subscriber stations and corresponding directions; and/or maintain a maximum latency requirement within the cluster by managing the use of viable paths An example Access Point Directivity Maintenance Algorithm may employ the following steps:

1) The Access Point will periodically assign a slot (or portion of a slot) to attached subscriber station for the transmission of an access waveform on the uplink. The access waveform may be broad beam or swept directional beacon.

2) The assigned uplink slot (or portion of an uplink slot) will be communicated to the other access points in the cluster.

3) The Access Point will listen to access waveforms from subscriber stations attached to neighboring Access Points in the cluster.

4) The Access Point will record the direction to all subscriber stations it detects in this uplink slot and communicate that visibility of the subscriber station back to the corresponding serving access point.

An example Subscriber Station Directivity Maintenance Algorithm may employ the following steps:

1) The subscriber station will monitor beacon waveforms, either broad beacon or swept, and record a direction for all access points that are detected. The subscriber station can make use of the periodic beacon transmissions for this purpose;

2) The subscriber station may inform its serving access point of the detected access points and their corresponding directions; and 3) The subscriber station would store the direction information for each access point so that it may be used for rapid rerouting should the current link be blocked.

Figure 5B:
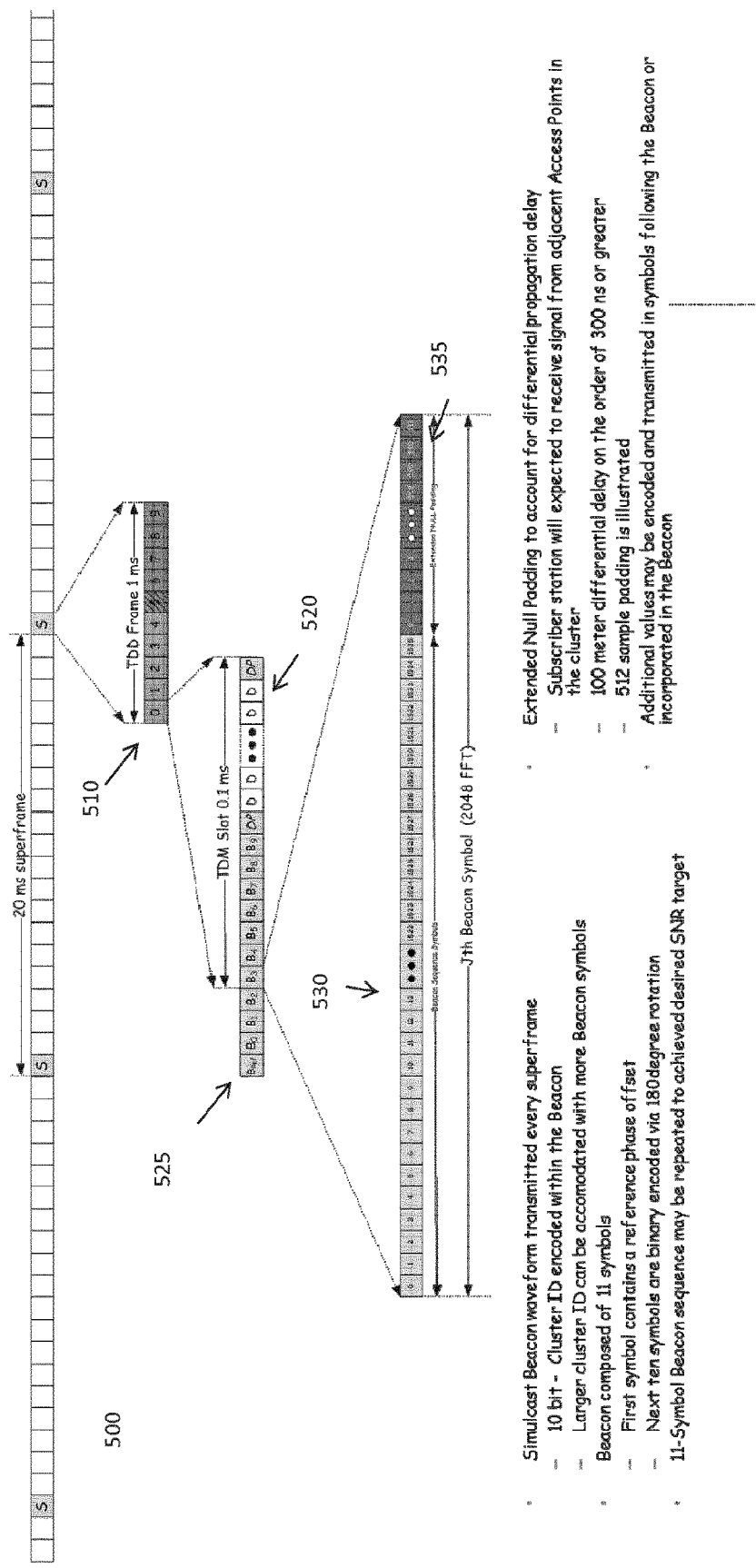
FIG. 5B illustrates an example beacon waveform in accordance with the exemplary embodiments of the invention.

FIG. 5B illustrates a non-limiting example of a beacon waveform in accordance with the exemplary embodiments. As shown in FIG. 5B a beacon, as indicated by "S", is transmitted in a superframe every 20 ms. The beacon may be in a 1 ms TDD frame 510 as shown or only occupy a small portion of the TDD frame. The TDD frame is encoded with a 10 bit cluster identification (ID), however, it is noted that a larger cluster ID can be accommodated with additional beacon symbols. As shown, the beacon 520 is composed of 11 symbols where the first symbol 525 of the beacon contains a reference phase offset (e.g., a pilot symbol). Further, the next 10 symbols of the beacon 520 are encoded using a 180 degree rotation. In accordance with the exemplary embodiments of the invention, an 11-symbol beacon sequence may be repeated to achieve a target signal to noise ratio (SNR). The Jth beacon symbol shown in FIG. 5B includes beacon sequence symbols 530 and extended null padding (where null padding is simply inserting zeros in place of regular (e.g., QAM) symbols) 535 to account for differential propagation delay. It is noted that 512 sample padding is illustrated in FIG. 5B. In accordance with the exemplary embodiments, the subscriber station can receive the signal 500 from the sending access point or via an adjacent access point of the cluster. There can be a 100 meter differential delay on the order of 300 ns or greater. Further, in accordance with the exemplary embodiments of the invention, additional values may be encoded in symbols following the beacon or encoded in the beacon itself.

Figure 7:
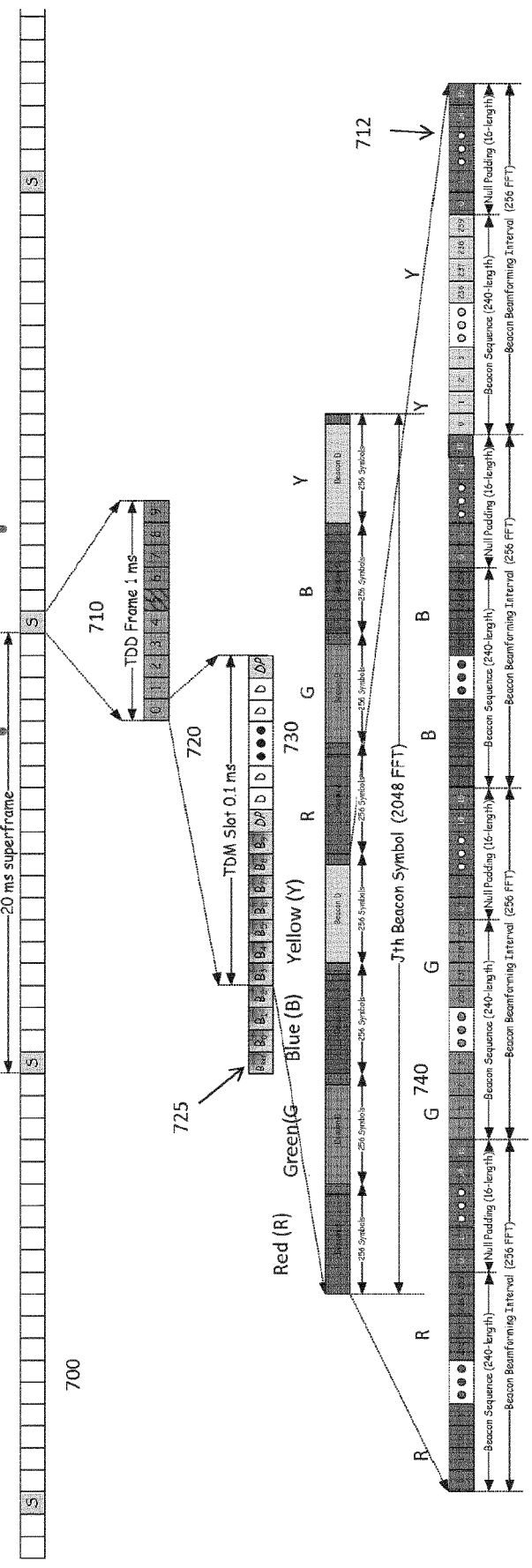
FIG. 7 illustrates an example swept waveform in accordance with the exemplary embodiments of the invention.

In accordance with the exemplary embodiments, the steps of cell selection which some or all may be applied using the swept beacon procedure are as follows:

a subscriber station will detect the Swept Beacon and identify the presence of a cluster;

each beacon instance should identify the cluster with a cluster ID;

the broadcast message contains the identity of the cluster;

the subscriber station transmits a system information request message to the cluster, this would be transmitted in a pre-determined contention slot and be known apriori by the subscriber station;

optionally, the location could be specified in the Swept Beacon;

the information request could act as a channel sounding signal to the cluster (e.g., to determine a best direction to steer the antenna array to the subscriber device);

alternatively, the access point could sweep through receive weights while the subscriber station repeated its access request;

access points in the cluster would detect the System Information Request;

one or more Access Points may detect the System Information Request the access points may collaborate to determine which access point has the best path to the subscriber station;

the cluster would send the system information to the subscriber station with the beamforming weights;

multiple Access Points may be simultaneously respond to the system information request;

once the system information is received by the subscriber station, it may proceed with further aspects of the access protocol such RACH, UL Grants & RRC Connect Requests;

one or more Access Points may detect the System Information Request;

the Access Points may collaborate to determine which Access Point has the best path to the subscriber station;

the cluster would send the system information to the subscriber station with the beamforming weights;

again, multiple Access Points may be simultaneously respond to the system information request; and once the system information is received by the subscriber station, it may proceed with further aspects of the access protocol such RACH, UL Grants & RRC Connect Requests In regards to FIG. 7 there is illustrated a non-limiting example of a swept beacon waveform in accordance with the exemplary embodiments. As shown in FIG. 7 a beacon, as indicated by "S", is transmitted in a superframe every 20 ms. The beacon may have a 1 ms TDD frame 710 or may simply only occupy a portion of the 1 ms TDD frame. The TDD frame is encoded with a 10 bit cluster identification (ID), however, it is noted that a larger cluster ID can be accommodated with additional beacon symbols. The beacon 720 is composed of 11 symbols. The first symbol 725 of the beacon contains a reference phase offset. Further, the next 10 symbols of the beacon 720 are encoded using a 180 degree rotation. In accordance with the exemplary embodiments of the invention, an 11-symbol beacon sequence may be repeated to achieve a target signal to noise ratio (SNR). The Jth beacon symbol shown in FIG. 7 includes 8 discrete intervals shown as red, green, blue, and yellow intervals. As shown in the sequence 740 there is a 256 sample length beacon internal beamforming interval, and a 240 beacon sequence length identical at all intervals. In accordance with the exemplary embodiments, the beamforming weights change with every 256 length interval. In addition, there are 16 sample null padding bits 712 which can serve a dual purpose. These null padding bits 712 can provide a cyclic extension for FFT processing and provide gap for antenna switching. Further, in accordance with the exemplary embodiments other variations of the signaling are possible. For example, more beamforming weights may be supported by spanning multiple beacon symbols, and an entire cluster ID may be transmitted prior changing weights (i.e., 11 256-length intervals in immediate succession).

Null Cyclic Prefix—Single Carrier

In this section the preferred use of null cyclic prefix carrier is described. However, the procedures described herein would work for any modulation technique including but not limited to OFDM, regular cyclic prefix single carrier, CDMA, GMSK, and PSK. The null cyclic prefix (CP) is part of the data or pilot block meaning that the symbol length is exactly 2048 samples independent of the CP length and there are exactly 75 symbols per 0.1 ms subframe. In addition, the null CP provides flexibility to adjust the CP length dynamically (per-user) since the block size is fixed. For data we could adjust to the changing data size simply using rate matching. For example we could have a few defined sizes (like 32, 64, 96, or 128) and choose them on a per-user basis based on the channel conditions for each user. The null CP would give us some ramp-down time which can be used to switch beams at RF. The null CP for one user (with one RF beam) would be the same for another user (with a different RF beam) which may make it easier to switch users within a slot (if desired). The receiver has an easy method to estimate post receiver noise plus interference since it will have zeros symbols at the end of the data block it equalizes. The null CPs have an advantage that very high Doppler (i.e., Doppler high enough that the channel changes significantly over a data block length) can be handled. Of course that a high doppler likely will note be used at pedestrian speeds even in a millimeter wave architecture. There could be some novelty in designing pilot sequences that are constant modulus in the frequency domain yet have low PAPR (measured on the non-zero time-domain symbols) with the zero insertion. In addition, future IR receivers (i.e., full base band solutions or hybrid approaches) could benefit from the null CP (e.g., the null portion gives some symbols where an equalizer can train knowing that no desired signal energy is present).

FIGS. 8A and 8B illustrate an example modulation numerology cyclic prefix (CP). With reference to FIGS. 8A and 8B there is a time division duplex frame size equal to 1 ms, a subframe size equal to 0.1 ms, a downlink interval equal to 50%, and an uplink interval equal to 50%. In addition, reference FIGS. 8A and 8B there is a null cyclic prefix single carrier with a bandwidth of 2000 Mhz, $T_s$ equal to 1.536 Ghz, Tguard target equal to 10 ns with a Tguard actual of 10.4 ns, a data block size of 2048 bits, and a pilot block size of 256 bits. Further, reference FIGS. 8A and 8B there is quadrature phase-shift keying (QPSK), 16 quadrature amplitude modulation (QAM).

Figure 11A:
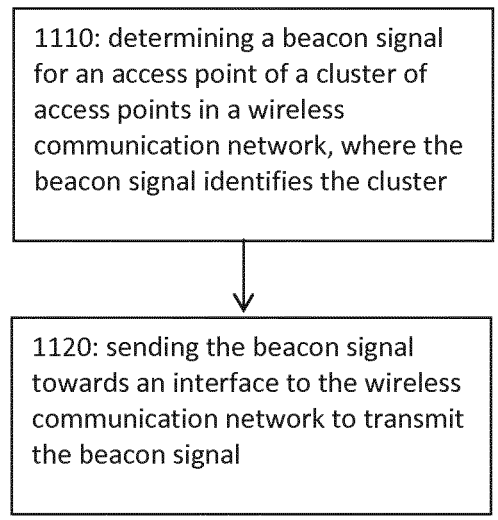
FIGS. 11A, 12A, and 11B, 12B are logic flow diagrams that are illustrative of a method, and the operation of a computer program product, for an access point and subscriber station, respectively, such as the access points 20-22 and the user device 24 as shown in FIG. 2.

In regards to FIG. 11A there is illustrated a method and the operation of a computer program product in accordance with an exemplary embodiments of the invention which may be performed by a network node, such as the access point 20, 21, and/or 22 as illustrated in FIG. 2. As shown in step 1110 of FIG. 11A there is determining a beacon signal for an access point of a cluster of access points in a wireless communication network, where the beacon signal identifies the cluster. Then at step 1120 there is sending the beacon signal towards an interface to the wireless communication network to transmit the beacon signal.

In accordance with the exemplary embodiments as described in the paragraph above, each access point of the cluster is overlapping a same coverage area in the wireless communication network.

In accordance with the exemplary embodiments as described in the paragraphs above, the wireless communication network is a millimeter wave spectrum network.

In accordance with the exemplary embodiments as described in the paragraphs above, the determined beacon signal is using a combined relative amplitude and phase shift identifying a direction of the beacon signal.

In accordance with the exemplary embodiments as described in the paragraphs above, the access point comprises at least one array, where each array of the at least one array comprises two or more antennas.

In accordance with the exemplary embodiments as described in the paragraphs above, the interface is associated with at least one array of the two or more antennas.

Further, in accordance with the exemplary embodiments as described in the paragraphs above, the determining comprises determining a relative amplitude and phase shift for each antenna of the at least one array.

In addition, in accordance with the exemplary embodiments of the invention, there is a means for determining a beacon signal for an access point of a cluster of access points in a wireless communication network, where the beacon signal identifies the cluster. Further, in accordance with the embodiments there is a means for sending the beacon signal towards an interface to the wireless communication network to transmit the beacon signal.

The exemplary embodiments of the invention as described in the paragraph above where the means for determining and means for sending comprises an interface to a wireless network, and at least one memory embodying computer program code, the computer program code executable by at least one processor.

Figure 11B:
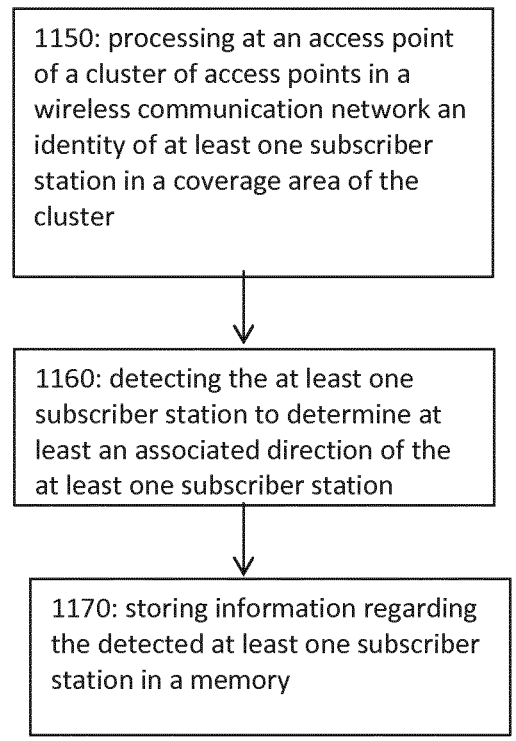

In regards to FIG. 11B there is illustrated a method and the operation of a computer program product in accordance with an exemplary embodiments of the invention which may be performed by a network node, such as the user device 24 as illustrated in FIG. 2. In step 1150 of FIG. 11B there is processing at an access point of a cluster of access points in a wireless communication network an identity of at least one subscriber station in a coverage area of the cluster. At step 1160 there is detecting the at least one subscriber station to determine at least an associated direction of the at least one subscriber station. Then at step 1170 there is storing information regarding the detected at least one subscriber station in a memory.

In accordance with the exemplary embodiments as described in the paragraph above, the direction is determined based at least in part on an amplitude and phase shift of the received at least one access request.

In accordance with the exemplary embodiments as described in the paragraphs above, there is sending information regarding the detected at least one subscriber station.

In accordance with the exemplary embodiments as described in the paragraphs above, the access point is a candidate access point and where the sending is to a serving access point of the cluster.

In accordance with the exemplary embodiments as described in the paragraphs above, the identity is received over a backhaul link.

In accordance with the exemplary embodiments as described in the paragraphs above, the backhaul link is between the access points of the cluster.

In accordance with the exemplary embodiments as described in the paragraphs above, the stored information comprises the direction associated with each of the at least one subscriber station.

In accordance with the exemplary embodiments as described in the paragraphs above, the wireless communication network comprises a millimeter wave spectrum.

Further, in accordance with the exemplary embodiments as described in the paragraphs above, there is receiving an indication of a need to reroute of an established wireless communication link to the subscriber station, and using at least the associated direction in the stored information regarding the at least one subscriber station to perform the rerouting.

In accordance with the exemplary embodiments as described in the paragraphs above, the detecting is using a time slot assigned to each of the at least one subscriber station by another access point of the cluster.

Further, in accordance with the exemplary embodiments of the invention, there is a means for processing at an access point of a cluster of access points in a wireless communication network an identity of at least one subscriber station in a coverage area of the cluster. Further, in accordance with the embodiments there is a means for detecting the at least one subscriber station to determine at least an associated direction of the at least one subscriber station. In addition, there is a means for storing information regarding the detected at least one subscriber station in a memory.

The exemplary embodiments of the invention as described in the paragraph above where the means for processing, detection, and storing comprises a memory, and at least one memory embodying computer program code, the computer program code executable by at least one processor.

Figure 12A:
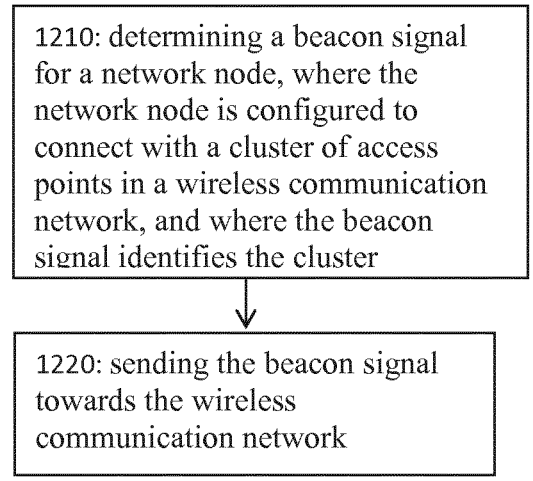

In regards to FIG. 12A there is illustrated a method and the operation of an apparatus in accordance with the exemplary embodiments of the invention which may be performed with a network node, such as the access point 20, 21, and/or 22 as illustrated in FIG. 2. As shown in step 1210 there is determining a beacon signal for a network node, where the network node is configured to connect with a cluster of access points in a wireless communication network, and where the beacon signal identifies the cluster. In step 1220 of FIG. 12A there is sending the beacon signal towards the wireless communication network.

In accordance with the exemplary embodiments as described in the paragraph above, the wireless communication network is a millimeter wave spectrum network.

In accordance with the exemplary embodiments as described in the paragraphs above, the network node comprises at least one array, where each array of the at least one array comprises two or more antennas.

In accordance with the exemplary embodiments as described in the paragraphs above, the sending is towards the at least one array of the two or more antennas.

In accordance with the exemplary embodiments as described in the paragraphs above, the determining comprises determining a relative amplitude and phase shift for each antenna of the at least one array.

Further, in accordance with the exemplary embodiments of the invention, there is at least means for determining a beacon signal for a network node, where the network node is configured to connect with a cluster of access points in a wireless communication network, and where the beacon signal identifies the cluster. In accordance with the exemplary embodiments of the invention there is at least means for sending the beacon signal towards the wireless communication network.

Figure 12B:
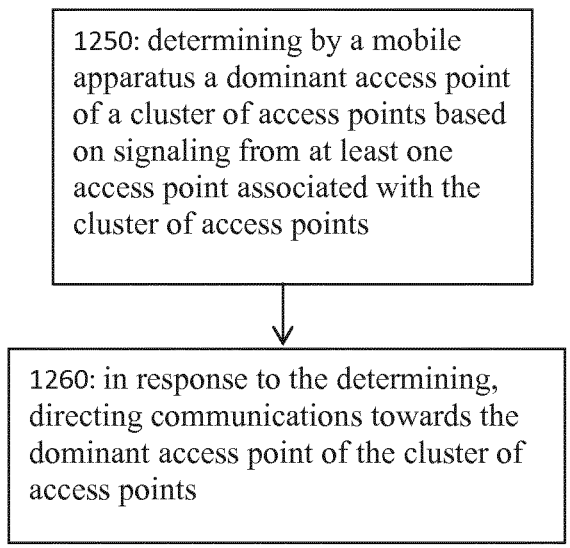

In regards to FIG. 12B there is illustrated a method and operations of an apparatus in accordance with the exemplary embodiments of the invention which may be performed with a network node, such as the user device 24 as illustrated in FIG. 2. In step 1250 there is determining by a mobile apparatus a dominant access point of a cluster of access points based on signaling from at least one access point associated with the cluster of access points. In step 1260 of FIG. 12B there is, in response to the determining, directing communications towards the dominant access point of the cluster of access points.

In accordance with the exemplary embodiments as described in the paragraph above, the signaling is from more than one access point of the cluster, and where the signaling comprises at least one beacon.

In accordance with the exemplary embodiments as described in the paragraphs above, the at least one beacon comprises a simulcast beacon from the more than one access point of the cluster.

In accordance with the exemplary embodiments as described in the paragraphs above, the at least one beacon comprises at least one of a master information block to provide system information to the mobile apparatus, and an identification of the cluster.

In accordance with the exemplary embodiments as described in the paragraphs above, the at least one beacon comprises a page indicator indicating an incoming call to the mobile apparatus.

In accordance with the exemplary embodiments as described in the paragraphs above, the signaling is using more than one beamforming antenna weight.

In accordance with the exemplary embodiments as described in the paragraphs above, the directing comprises directing at least one antenna beam of the mobile apparatus at the dominant access point based on the signaling using the more than one beamforming antenna weights.

In accordance with the exemplary embodiments as described in the paragraphs above, there is sending a system information request message towards the cluster, where the signaling is in response to the system information request message.

In accordance with the exemplary embodiments as described in the paragraphs above, the beacon uses a broad beam pattern.

In accordance with the exemplary embodiments as described in the paragraphs above, the beacon using the broad beam pattern is simulcast with an access point of the cluster of access points.

In accordance with the exemplary embodiments as described in the paragraphs above, the beacon is encoded with at least one of an identification of the cluster, a paging indicator, and a master information block.

Further, in accordance with the exemplary embodiments of the invention, there is at least means for determining by a mobile apparatus a dominant access point of a cluster of access points based on signaling from at least one access point associated with the cluster of access points; and means, in response to the determining, for directing communications towards the dominant access point of the cluster of access points.

In accordance with the exemplary embodiments of the invention as in the paragraphs above, at least the means for determining and the means for directing comprises a computer readable medium embodying computer program code, the computer program code executable by at least one processor.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, and as was noted above, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

As but one example, while some of the exemplary embodiments may have been described above in the context of an E-UTRAN (UTRAN-LTE) system, it should be appreciated that the exemplary embodiments of this invention are not limited for use with only this one particular type of wireless communication system, and that they may be used to advantage in other wireless communication systems. Further, the exemplary embodiments of this invention are not constrained for use with any specific frame format, numbers of blocks or long blocks within a frame, sub-carrier mapping scheme and/or type of modulation, as non-limiting examples, that may have been referred to above.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   determining a beacon signal for an access point, wherein the access point is in a cluster of access points in a wireless communication network, wherein the beacon signal identifies the cluster to a subscriber station, wherein the wireless communication network is a millimeter-wave-spectrum network, and wherein the access points in the cluster of access points cover an area surrounding the subscriber station to enable regions of the area shadowed by millimeter-wave opaque objects to be covered by a propagation direction from at least one of the access points not obstructed by a millimeter-wave opaque object; and
   sending a message including the beacon signal towards the wireless communication network for use by other access points in the cluster of access points, whereby the subscriber station selects a dominant access point in the cluster or in neighboring clusters in the wireless communication network for access to the wireless communication network based on a strength of the beacon signal received by the subscriber station,
   wherein the beacon signal is a swept beacon repeating the beacon signal with varying antenna weights to span the area surrounding the subscriber station.

2. The method according to claim 1, wherein the access points comprise at least one array, wherein each array of the at least one array comprises two or more antennas.

3. The method according to claim 2, wherein the sending is towards the at least one array of the two or more antennas.

4. The method according to claim 2, wherein the determining comprises determining a relative amplitude and phase shift for each antenna of the at least one array.

5. The method according to claim 1, wherein the beacon uses a broad beam pattern.

6. The method according to claim 5, wherein the beacon using the broad beam pattern is simulcast with another access point of the cluster of access points.

7. The method according to claim 1, wherein the beacon is encoded with at least one of an identification of the cluster, a paging indicator, and a master information block.

8. A computer program product embodied on a non-transitory readable medium in which a computer program is stored that, when being executed by at least one processor, is configured to provide instructions to control or carry out the method according to claim 1.

9. The method of claim 1, wherein the access points of the cluster overlap coverage of the area of the wireless communication network surrounding the subscriber station.

10. The method of claim 1, wherein backhaul links at least allow communication between the access points of the cluster.

11. An apparatus comprising:
at least one processor; and
at least one memory including computer program code, where the at least one memory and the computer program code are configured, with the at least one processor, to cause the apparatus to at least:
determine a beacon signal, wherein the apparatus is an access point in a cluster of access points in a wireless communication network, wherein the beacon signal identifies the cluster to a subscriber station, wherein the wireless communication network is a millimeter-wave-spectrum network, and wherein the access points in the cluster of access points cover an area surrounding the subscriber station to enable regions of the area shadowed by millimeter-wave opaque objects to be covered by a propagation direction from at least one of the access points not obstructed by a millimeter-wave opaque object; and
send a message including the beacon signal towards the wireless communication network for use by other access points in the cluster of access points, wherein whereby the subscriber station selects a dominant access point in the cluster or in neighboring clusters in the wireless communication network for access to the wireless communication network based on a strength of the beacon signal received by the subscriber station,
wherein the beacon signal is a swept beacon repeating the beacon signal with varying antenna weights to span the area surrounding the subscriber station.

12. The apparatus according to claim 11, wherein the apparatus comprises at least one array, wherein each array of the at least one array comprises two or more antennas.

13. The apparatus according to claim 12, wherein the sending is towards the at least one array of the two or more antennas.

14. The apparatus according to claim 11, wherein the determining comprises determining a relative amplitude and phase shift for each antenna of the at least one array.

15. The apparatus of claim 11, wherein the access points of the cluster overlap coverage of the area of the wireless communication network surrounding the subscriber station.

16. The apparatus of claim 11, wherein backhaul links at least allow communication between the access points of the cluster.

17. A computer program product embodied on a non-transitory computer-readable medium in which a computer program is stored that, when being executed by a computer, is configured to provide instructions to control or carry out:
determining a beacon signal for an access point, wherein the access point is in a cluster of access points in a wireless communication network, wherein the beacon signal identifies the cluster to a subscriber station, wherein the wireless communication network is a millimeter-wave-spectrum network, and wherein the access points in the cluster of access points cover an area surrounding the subscriber station to enable regions of the area shadowed by millimeter-wave opaque objects to be covered by a propagation direction from at least one of the access points not obstructed by a millimeter-wave opaque object; and
sending a message including the beacon signal towards the wireless communication network for use by other access points in the cluster of access points, whereby the subscriber station selects a dominant access point in the cluster or in neighboring clusters in the wireless communication network for access to the wireless communication network based on a strength of the beacon signal received by the subscriber station,
wherein the beacon signal is a swept beacon repeating the beacon signal with varying antenna weights to span the area surrounding the subscriber station.

* * * * *